US011199180B2

(12) United States Patent
Cole

(10) Patent No.: US 11,199,180 B2
(45) Date of Patent: *Dec. 14, 2021

(54) VESSEL-MOUNTED OCEAN THERMAL ENERGY CONVERSION SYSTEM

(71) Applicant: The Abell Foundation, Inc., Baltimore, MD (US)

(72) Inventor: Barry R. Cole, Mineral, VA (US)

(73) Assignee: The Abell Foundation, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,087

(22) Filed: Mar. 16, 2020

(65) Prior Publication Data
US 2021/0003118 A1    Jan. 7, 2021

Related U.S. Application Data

(63) Continuation of application No. 15/112,781, filed as application No. PCT/US2015/012102 on Jan. 20, 2015, now Pat. No. 10,590,918.

(Continued)

(51) Int. Cl.
*F03G 7/05* (2006.01)
*B63B 35/44* (2006.01)
(Continued)

(52) U.S. Cl.
CPC ............... *F03G 7/05* (2013.01); *B63B 35/44* (2013.01); *F01D 15/10* (2013.01); *F16L 27/053* (2013.01); *F16L 27/107* (2013.01); *F16L 35/00* (2013.01); *B63B 2035/4433* (2013.01); *B63B 2035/4453* (2013.01); *Y02E 10/30* (2013.01)

(58) Field of Classification Search
CPC ... F03G 7/05; B63B 35/44; B63B 2035/4433; F01D 15/10
See application file for complete search history.

(56) References Cited

U.S. PATENT DOCUMENTS 4,231,312 A    11/1980    Person
4,312,288 A    1/1982    Finsterwalder et al.
(Continued)

FOREIGN PATENT DOCUMENTS

CN    102644565    8/2012
GB    2383978    7/2003
(Continued)

OTHER PUBLICATIONS

JP Office Action in Japanese Application No. 2016-547583, dated Apr. 1, 2020, 5 pages (With machine translation).
(Continued)

*Primary Examiner* — Joseph Ortega
(74) *Attorney, Agent, or Firm* — Fish & Richardson P.C.

(57) ABSTRACT

An offshore power generation system comprising: a floating portable platform having one or more OTEC heat exchange units, one or more turbine generators, a water intake and discharge system, a mooring system; and a fixed manifold having one or more cold water intake connections in communication with a cold water pipe, and one or more cold water discharge connections in communication with the water intake system of the floating platform via an intermediate cold water conduit, wherein each cold water discharge connection is detachable from the intermediate cold water pipe.

20 Claims, 14 Drawing Sheets

Related U.S. Application Data

(60) Provisional application No. 61/929,210, filed on Jan. 20, 2014.

(51) Int. Cl.
*F01D 15/10* (2006.01)
*F16L 27/053* (2006.01)
*F16L 27/107* (2006.01)
*F16L 35/00* (2006.01)

(56) References Cited

U.S. PATENT DOCUMENTS

| | | |
|---|---|---|
| 4,384,459 A | 3/1983 | Johnston |
| 7,770,394 B2 | 8/2010 | Beck |
| 8,572,967 B1 | 11/2013 | Cowden et al. |
| 9,476,410 B2 | 10/2016 | Srinivasan |
| 2009/0152868 A1 | 6/2009 | Beck |
| 2010/0122532 A1 | 5/2010 | Hsu |
| 2010/0139272 A1 | 6/2010 | Howard et al. |
| 2010/0180924 A1 | 7/2010 | Bailey |
| 2010/0181054 A1 | 7/2010 | Nagurny |
| 2010/0300095 A1 | 12/2010 | Sakurai |
| 2011/0000952 A1 | 1/2011 | Takeshita |
| 2011/0011572 A1 | 1/2011 | Nagurny |
| 2011/0036919 A1 | 2/2011 | Baird |
| 2011/0079375 A1 | 4/2011 | Nagurny |
| 2011/0127022 A1 | 6/2011 | Eller |
| 2011/0173978 A1 | 7/2011 | Rekret |
| 2011/0173979 A1 | 7/2011 | Krull |
| 2011/0293379 A1 | 12/2011 | Halkyard |
| 2011/0318106 A1 | 12/2011 | Gateff |
| 2012/0011849 A1 | 1/2012 | Cole |
| 2012/0073291 A1 | 3/2012 | Shapiro |
| 2012/0080164 A1 | 4/2012 | Nagurny |
| 2012/0080175 A1 | 4/2012 | Levings |
| 2012/0125561 A1 | 5/2012 | Levings |
| 2013/0011199 A1 | 1/2013 | Kibbee |
| 2013/0042612 A1 | 2/2013 | Shapiro |
| 2013/0042613 A1 | 2/2013 | Ross |
| 2013/0042996 A1 | 2/2013 | Hwang |
| 2013/0074498 A1 | 3/2013 | Lelarge et al. |
| 2013/0098035 A1 | 4/2013 | McAlister |
| 2013/0145761 A1 | 6/2013 | McAlister |
| 2015/0075657 A1 | 3/2015 | Edwards |
| 2015/0260464 A1 | 9/2015 | Cole |
| 2015/0285403 A1 | 10/2015 | Cole |
| 2015/0292490 A1 | 10/2015 | Cole |
| 2016/0341185 A1 | 11/2016 | Cole |

FOREIGN PATENT DOCUMENTS

| | | |
|---|---|---|
| JP | S55-152982 | 11/1980 |
| JP | H01-219360 | 9/1989 |
| JP | 2012149968 | 8/2012 |
| JP | 2013-523517 | 6/2013 |
| WO | WO 2011091295 | 7/2011 |
| WO | WO 2011139776 | 11/2011 |
| WO | WO 2012009541 | 1/2012 |
| WO | WO 2013025797 | 2/2013 |

OTHER PUBLICATIONS

U.S. Appl. No. 10/590,918, filed Mar. 17, 2020, Cole.
IN Examination Report in Indian Appln. No. 201617024843, dated Jun. 22, 2020, 5 pages (with English translation).
MX Office Action in Mexican Appln. No. MX/a/2016/009506, dated Jul. 30, 2020, 7 pages (with English translation).
MX Office Action in Mexican Appln. No. MX/a/2016/009506, dated Dec. 16, 2019, 4 pages (with English translation).
EP Office Action by European Appln. No. 15736922.4, dated May 3, 2021, 4 pages.
CN Office Action in Chinese Application No. 201580015194.5, dated May 3, 2018, 18 pages (with English translation).
CN Office Action in Chinese Application No. 201580015194.5, dated May 5, 2019, 19 pages (With English Translation).
EP European Search Report in European Application No. 15736922.4, dated Feb. 10, 2017, 35 pages.
JP Office Action in Japanese Application No. 2016-547583, dated Aug. 8, 2018, 31 pages (with English translation).
JP Office Action in Japanese Application No. 2016-547583, dated Jun. 20, 2019, 16 pages (With English Translation).
JP Office Action in Japanese Appln. No. 2016/547583, dated Jan. 26, 2021, 8 pages (with English translation).
KR Office Action in Korean Appln. No. No. 10-2016-7022776, dated Dec. 21, 2020, 6 pages (with English translation).
PCT International Search Report and Written Opinion in International Application No. PCT/US2015/012102, dated May 6, 2015, 11 pages.

VESSEL-MOUNTED OCEAN THERMAL ENERGY CONVERSION SYSTEM

CROSS-REFERENCE TO RELATED APPLICATIONS

This application is a continuation application of and claims priority to U.S. application Ser. No. 15/112,781, filed on Jul. 20, 2016, which is the US National Phase of International Application Serial No. PCT/US2015/012102, filed on Jan. 20, 2015, which claims priority to U.S. Application Ser. No. 61/929,210, filed on Jan. 20, 2014. The entire disclosure of each application is hereby incorporation by reference.

TECHNICAL FIELD

This invention relates to Ocean Thermal Energy Conversion (OTEC) plants, and more particularly to floating OTEC plants.

BACKGROUND

Ocean Thermal Energy Conversion ("OTEC") is a manner of producing renewable energy using solar energy stored as heat in the oceans' tropical regions. Tropical oceans and seas around the world offer a unique renewable energy resource. In many tropical areas (between approximately 20° north and 20° south latitude), the temperature of the surface sea water remains nearly constant. To depths of approximately 100 ft the average surface temperature of the sea water varies seasonally between 75° and 85° F. or more. In the same regions, deep ocean water (between 2500 feet and 4200 feet or more) remains a fairly constant 40° F. Thus, the tropical ocean structure offers a large warm water reservoir at the surface and a large cold water reservoir at depth, with a temperature difference between the warm and cold reservoirs of between 35° to 45° F. This temperature difference remains fairly constant throughout the day and night, with small seasonal changes.

The OTEC process uses the temperature difference between surface and deep sea tropical waters to drive a heat engine to produce electrical energy. OTEC power generation was identified in the late 1970's as a possible renewable energy source having a low to zero carbon footprint for the energy produced. An OTEC power plant, however, has a low thermodynamic efficiency compared to more traditional, high pressure, high temperature power generation plants. For example, using the average ocean surface temperatures between 80° and 85° F. and a constant deep water temperature of 40° F., the maximum ideal Carnot efficiency of an OTEC power plant will be 7.5 to 8%. In practical operation, the gross power efficiency of an OTEC power system has been estimated to be about half the Carnot limit, or approximately 3.5 to 4.0%. Additionally, analysis performed by leading investigators in the 1970's and 1980's, and documented in "Renewable Energy from the Ocean, a Guide to OTEC" William Avery and Chih Wu, Oxford University Press, 1994 (incorporated herein by reference), indicates that between one quarter to one half (or more) of the gross electrical power generated by an OTEC plant operating with a $\Delta T$ of 40° F. would be required to run the water and working fluid pumps and to supply power to other auxiliary needs of the plant. On this basis, the low overall net efficiency of an OTEC power plant converting the thermal energy stored in the ocean surface waters to net electric energy has not been a commercially viable energy production option.

Environmental concerns associated with an OTEC plant have also been an impediment to OTEC operations. Traditional OTEC systems draw in large volumes of nutrient rich cold water from the ocean depths and discharge this water at or near the surface. Such discharge can effect, in a positive or adverse manner, the ocean environment near the OTEC plant, impacting fish stocks and reef systems that may be down current from the OTEC discharge.

SUMMARY

Vessel-mounted OTEC plants are optimally moored on station and provide electricity to the grid 24 hours a day, 365 days a year. The platform supports and protects machinery and operating personnel but must be able to survive in severe ocean storms. In the case of 2-10 megawatt floating production plants that would serve small commercial markets, a sea-going barge is the best platform. Its relatively large size supports the bulky multiple component OTEC machinery at a reasonable capital cost while providing a relatively stable and survivable platform for OTEC operations. The personnel have access for inspection and repair, which would be impossible with a scaled-down spar.

In an example implementation of the present invention, an offshore power generation system comprises a floating portable platform having one or more OTEC heat exchange units, one or more turbine generators, a water intake and discharge system, and a mooring system. The offshore power generation system also comprises a fixed manifold including one or more cold water intake and/or return connections in communication with cold water pipe(s); one or more cold water discharge connections in communication with the water intake and/or return system of the floating platform via an intermediate cold water conduit, wherein each intermediate cold water discharge pipe connection is detachable from the manifold, and each discharge pipe connection of the discharge pipe running from cold water intake and running to cold water discharge depth is detachable from the manifold. The fixed manifold may also include a warm water return system including one or more warm water return connections in communication with warm water pipes; one or more warm water discharge connections in communication with the water return system of the floating platform via an intermediate warm water conduit, wherein each warm water discharge connection is detachable from the intermediate warm water pipe, and a warm water discharge pipe running from the manifold to an open end at discharge depth that is detachable from the manifold. In some cases, the manifold itself is segmented into watertight boundaries for each type of flow: cold water intake, cold water return and warm water return. In some cases, the cold water return and warm water return pipes running from the manifold to return depth run parallel, are banded together and discharge at the same depth to provide mixing of flows.

Other example implementations of the present invention may include one or more of the following features. Some system have one or more OTEC heat exchange units comprising a multi-stage cascading hybrid OTEC heat exchange system. In some systems, each OTEC heat exchange unit is connected to the water intake and discharge system to allow for substantially linear flow of cold water and hot water across the OTEC heat exchange unit. In some systems, each OTEC heat exchange unit comprises a plurality of heat exchange plates positioned in the flow path of the cold water supply. In some systems, each OTEC heat exchange unit comprises a plurality of heat exchange plates positioned in the flow path of the warm water supply. In some systems, an OTEC working fluid flows through an interior passage of one or more heat exchange plates, each heat exchange plate surrounded by and in the flow path of the cold or warm water supply. In some systems, each OTEC heat exchange unit comprises four cascading heat exchange zones. In some systems, each cascading heat exchange zone arranged to facilitate horizontal flow of the cold or warm water supply. In some systems, the water intake and discharge system comprises a warm water supply pump and a cold water supply pump. In some systems, the water intake and discharge system includes a warm or cold water discharge pump.

In some cases, there are only the intake pumps as all the pumping power needed to flow the water through the system—from intake opening to return opening—is performed by the intake pump(s). There may be more than one primary seawater pump for warm and cold seawater systems. For example, there can be at least one and possibly more dedicated warm water seawater pumps for each evaporator chamber, and at least one and possibly more dedicated cold water primary seawater pumps for each condenser chamber. Multiple pumps provide redundancy so that, for example, if a pump should need maintenance, but none is required of the heat exchangers at the time, water can be flowed through the heat exchanger chamber with minimal net power output reduction. Because the pump intakes are at or below sea level, the design reduces head pressure requirements, so smaller motors with lower parasitic loads can be used to drive pumps large enough to accomplish this work.

In some systems, one or more discharge pipe(s) is (are) in communication with the discharge of the water intake and discharge system(s). In some systems, the intermediate cold water pipe(s) is (are) detachable from the water and intake discharge system. In some systems, the intermediate warm water pipe(s) is (are) detachable from the water discharge system. In some systems, the discharge pipe(s) is (are) detachable from the water intake and discharge system. In some systems, the terminal end of the warm water discharge pipe is open at a depth between 25 and 300 feet (e.g., between 250 and 600 feet). In some systems, the terminal end of the cold water discharge pipe is open at a depth between 25 and 600 feet (e.g., between 250 and 600 feet). In some systems, the terminal end of the warm water and cold water discharge pipes discharge water at a depth having a temperature within 10 degrees Fahrenheit of the ambient water. Some systems also comprise a cold water discharge pipe in communication with the water intake and discharge system and the fixed manifold; a warm water discharge pipe in communication with the water intake and discharge system and the fixed manifold; wherein the warm and cold water discharge are mixed in the fixed manifold and discharged from the manifold at a temperature within 10 degrees Fahrenheit of the ambient water.

In some cases, where the flows and pressures are not the same, this can create a differential head from one system that can interfere with the flow of the other system, possibly preventing the system from operating as intended. In some cases, the fixed manifold has separate chambers for warm and cold water discharges. The flows discharge at the same depth and are nozzled so that the flows cross and mix in the open ocean instead of inside a single chamber. By allowing each system to operate independently, each system can be sized appropriately to reduce power required.

Some systems comprise mixing nozzle(s) in communication with the warm and cold water discharge(s). In some systems, the cold water pipe is coupled directly to the water intake and/or discharge system via a cold water pipe connection. Some systems comprise an auxiliary cold water supply exiting the heat exchanger and flowing to an auxiliary fixed manifold and supplying an auxiliary system. In some systems, the auxiliary system is a shore based air conditioning system or a desalination system or a combination of both systems.

In yet another example implementation of the present invention, a method of power generation within the littoral offshore zone comprises the steps of: providing a portable floating OTEC power generation station, wherein the floating OTEC power generation station comprises; one or more OTEC heat exchange units;

one or more turbine generators; a water intake and discharge system; and a mooring system; fixing a water intake manifold to the sea floor at a depth between 30 and 450 feet; connecting a cold water pipe to the fixed water intake manifold; connecting an intermediate cold water pipe between the fixed water intake manifold and the water intake and discharge system of the floating OTEC power generation station.

Various implementations of the present invention present one or more of the following advantages:

Vessels, e.g., barges, of the size needed for this application are easily constructed in most coastal nations, enabling commercialization of this technology globally.

Barges can easily be built in one location and towed to the operating site, thereby facilitating broad use of this technology, even at remote islands.

A barge-mounted OTEC plant, as with any power barge, can provide electricity to remote communities isolated from a major power grid, enabling local electrification and development.

Barges take advantage of the island and near-island geological formation with a narrow, shallow shelf and a very steep escarpment that drops to great depths. Mooring in deep water is difficult and expensive compared to the amount of energy required. Operating from land involves cutting very wide swaths of 40 feet to 60 feet through the reef for the four warm and cold water intake and return pipes. By mooring in the shallow shelf close to the drop off, barge-mounted OTEC plants are able to:

a) use relatively short lengths of commercially available HDPE pipe to extract and return cold seawater and warm seawater;

b) stay in the lee of land for reduced wind and wave effects c) use a shorter run of power cable to shore, with minimal impact to the reef, deployed and reefed from a service barge instead of a specialty cable laying ship from the other side of the world d) moor in shallower water at depth divers routinely work e) moor using commercially available anchoring systems (not customized) installed from a service barge instead of a specialty mooring ship from thousands of miles away f) provide a stable platform for the power generating equipment g) provide jobs for the local economy during site development, through construction and installation, and during operation h) be built in many shipyards around the world (does not require a large dry-dock or construction basin with mega-lift capacity crane service i) use systems, sub-systems and components that are commercially available stock items with pedigrees and technical data, a proven support infrastructure, and global warehousing for speedy replacement, if needed, and for which the lowest replaceable units are sized such that they can be shipped by common truck, or air carrier.

A barge is an excellent platform for efficient flow of seawater and working fluid for the net power output of 2.5 megawatts to 5.0 megawatts required by a very large number of island communities.

The barge design, with the moon pool in the center, uses the hull to screen out flotsam and jetsam by shielding the intake. The moon pool also minimizes surface turbulence in the immediate area of the intake and minimize risk of "gulping" air and the insulative nature and temperature of the hull surrounding the moon pool helps to negate thermal effects of rain and surface mixing during storms;

In many island communities with an average maximum demand of 100 to 200 megawatts, there is a very high risk of power grid disruption if a single 25 MW or larger (25% or more of the demand load) generating plant trips off line (as could happen if a ship anchor drops onto the submarine power cable of an OTEC plant moored farther from shore). Several 5 MW OTEC barges can be dispersed around the island, tying into the grid at various points, to provide system redundancies and help ensure transmission and distribution stability and speedy disaster recovery.

The barge-mounted OTEC plant will be located close to shore (typically one mile or less from shore), out of shipping lanes, in waters typically shallower than pelagic fishing occurs in, yet returns seawater that enhances the food chain to a depth just offshore where local fishermen can benefit.

The barge is moored in relatively shallow water. This opens the opportunity to seek services from more ocean surveyors, construction firms, divers, tug and supply barge services, including local instead of global companies, thereby creating jobs for the local economies throughout the planning and construction phases and making OTEC projects more economically viable.

The 5 MW OTEC plant produces lower voltage power that is transmitted to shore in a smaller diameter submarine power cable. The Horizontal Directional Drilled bore-hole is smaller in diameter, having lower cost of installation and impact on the environment. The cable is lower cost, and being such a short run from shore in relatively shallow water, can be easily retrieved and repaired if necessary. A replacement cable can be deployed and installed, if needed, in relatively short time by a commercial tug and barge service firm without the need for a specialty cable-laying ship.

The mooring system for the barge-mounted OTEC plant is significantly smaller in scale than for a spar. The mooring anchors are set in relatively shallow water, a process that can be and is routinely done by commercial tug and barge service firms, such as Healy-Tibbitts. A specialty mooring ship is not required.

Because the barge is so close to shore, consumable supplies can be transported to the plant by boat. There is no need for helicopter services. Because of this, there is no need for special helicopter design and certification on the barge.

The barge, with the 8-point moor, provides a highly stable platform for the OTEC machinery, so commercial-grade power equipment that is readily available from many suppliers around the world can be specified and supplied quickly and competitively, while ensuring best value and economic viability.

The barge and fixed manifold address the problem of excessive motion of the platform stressing and prematurely failing the cold water pipe. By using several smaller diameter but more flexible commercially available standard size HDPE risers from the platform to the fixed manifold, set and anchored to the sea floor well below the wave forces at the surface, then large diameter commercially available HDPE pipes from the manifold to terminal depths, the cold water intake and cold water and warm water return pipes are more survivable. Multiple risers of each type of flow provide redundancy. The risers can be detached and anchored to the sea floor prior to a severe storm, such as a Category 3 or higher hurricane, then quickly retrieved and reattached so that operation can be restored and power to the utility grid quickly reenergized for speedy disaster recovery. By using standard size, commercially available HDPE pipes, with technical data available attesting to performance characteristics, overall project risk is mitigated while costs are predictable and constrained. The support system is already in place.

In the event of severe storms (e.g., a Category 3 or higher hurricane), the barge can be detached from the seawater pipes and moorings and towed to safe harbor. Modern weather forecasting, aided by satellite imagery and hurricane chasing airplanes, can usually provide several days warning of severe tropical storms, enough time to take such precautionary action.

The barge provides large, open deck area for operations and maintenance. Equipment can easily be removed, moved, repaired or replaced, and the system restored quickly and efficiently. This openness also facilitates easier and speedier installation of equipment at a lower cost than installation in a confined and cramped space such as a spar.

The sizes of the system components comprising the power block and marine systems of the 5 MW OTEC plant are such that common, off-the-shelf stock piping, valves and fittings can be used, for which a competitive pricing and support structure already exist, thereby minimizing manufacturing, assembly, operation and cost risks.

The main deck of the barge can be fully encapsulated using a curved covering, much like a Quonset hut structure, to prevent direct sunlight and rain from striking the surfaces of the equipment housings, thereby reducing maintenance requirements, prolonging their service life, and lowering operating costs. The enclosure also serves as a barrier to release of ammonia vapor in the event of a major leak. Ammonia gas is given off more easily from an aqueous solution as the temperature increases, so the deck covering will hold the vapors inside while the water mist system, attached to the underside of the structure of the deck covering, captures the ammonia in an aqueous solution that can be drained into tanks in the hull, and from which the anhydrous ammonia can safely be extracted and recycled. The curved deck covering also provides a smooth slip stream for wind in a storm, much like the leading edge of an airplane wing. Lastly, the barges can be painted so that its appearance blends smoothly in with the surrounding sea and sky so that the barge may pose minimal visually intrusion due to its proximity to shore.

Two major challenges of small commercial OTEC systems on a barge or smaller vessel are the long-term performance of the CWP connection to the platform and the survivability of the platform with quick return to service in severe storm conditions. The disclosed design reduce connection stresses and mitigate these critical risks: (1) by inserting the manifold thus providing a "two-step" connection from the long 3000+ feet CWP to a manifold and then from the manifold 25 feet to 300 feet to the platform; (2) by using smaller, more flexible piping in the higher stress shallow region from the platform to the manifold and stronger, more rigid and larger pipe for manifold to the deep water intake and return; and (3) designing the capacity to detach the pipes from the platform to the manifold in severe hurricane conditions, shutting down operations in a controlled process, with the ability to quickly re-attach after the storm, rather than suffer pipe breakages at the connection point.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Compact OTEC plants can be installed on vessels, e.g., barges, to serve island or shoreline utilities. Vessel-mounted OTEC plants can provide cost-efficient generation of electricity. Such OTEC plant can also provide battery storage system, ancillary services to help stabilize and sustain the utility grid and provide ride-through and ramp up capability during utility grid frequency and voltage fluctuations. Vessel-mounted OTEC plants can operate in normal weather and ocean conditions, and survive hurricane conditions (e.g., up to Category 3). Mooring systems, piping systems, and transmission lines can be configured to work with and have low impacts on the local environment.

Infrastructure for a vessel-mounted OTEC plant is configured to provide a mooring site for the vessel-mounted OTEC plant in 100 to 300 feet of water. The seabed profile for a specific site determines the exact geometry and arrangement of the system. Typically, at this depth, the mooring site is within a mile of shore, yet far enough offshore that the vessel, when present, is visually non-intrusive to observers onshore. This depth range and distance from shore provides easy accessibility for site surveys, initial plant set up, maintenance, and regular crew rotations. Offshore industrial divers routinely work to this depth setting mooring anchors, laying submarine power cable to shore and connecting large diameter pipes, so recovery and restoration of operations following a severe storm, such as a hurricane, is reasonably achievable in terms of time and cost. This design provides for long term (e.g., 25+ years) commercial operability by addressing long term survivability of platform connection to essential pipelines and near-continuous long-term operation with short duration shut-downs based on controlled operating plans for severe weather conditions. The manifold solution also reduces project cost by using less expensive HDPE pipe for low-stress long sub-sea pipelines and more expensive flexible piping for short run from manifold to platform.

System features are discussed with respect to examples including barge-mounted OTEC plants. However, OTEC plants incorporating many of the features described can also be mounted on other vessels such as, for example, small semi-submersibles, submersibles, spars and multi-legged spars.

Figure 1A:
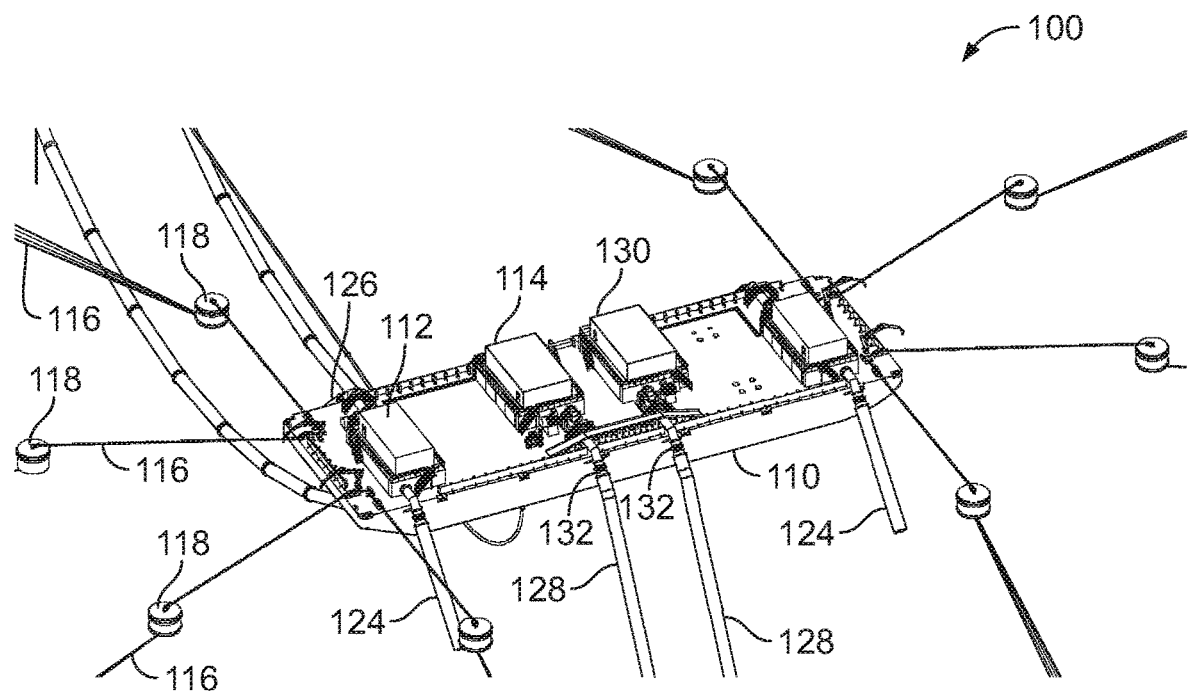
FIGS. 1A and 1B are, respectively, perspective and end views of an exemplary OTEC plant.
Figure 1B:
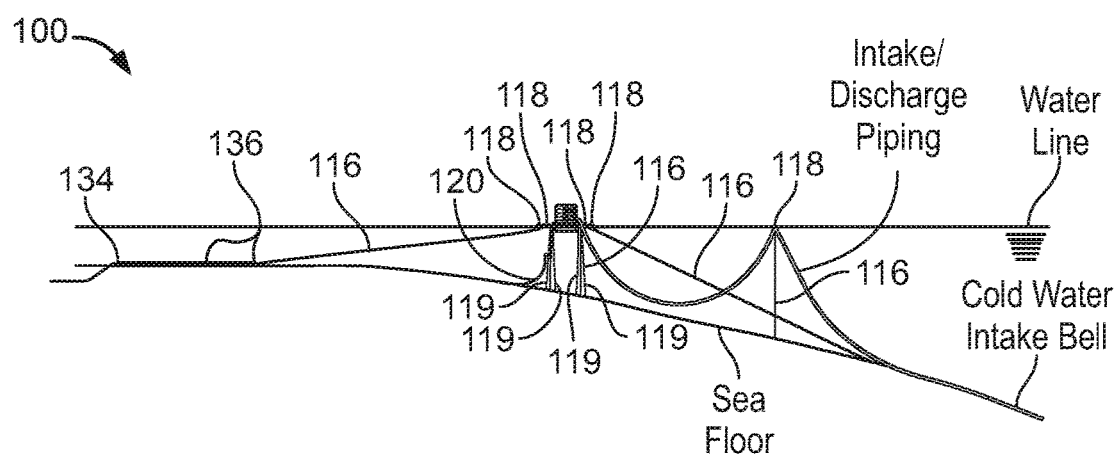
Figure 2:
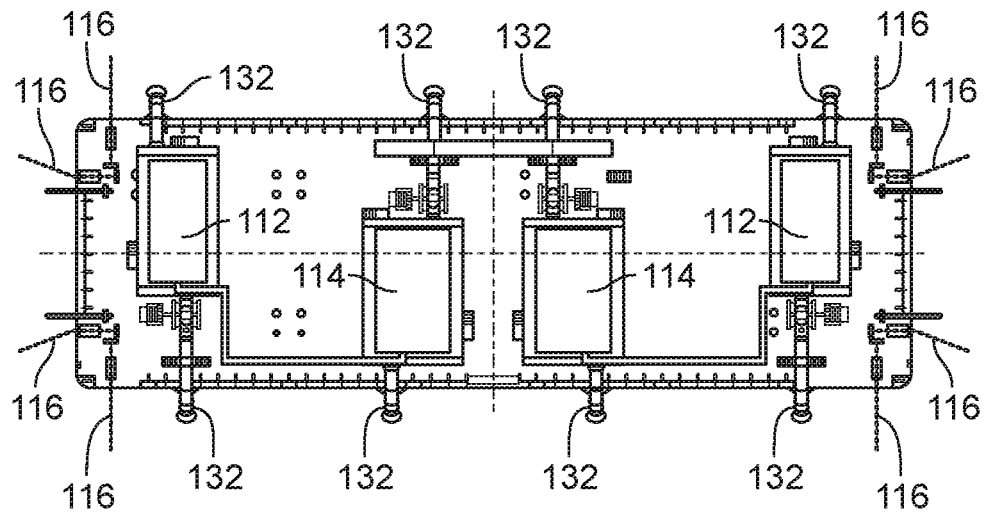
FIG. 2 is a plan view of the OTEC plant of FIGS. 1A and 1B.
Figure 3:
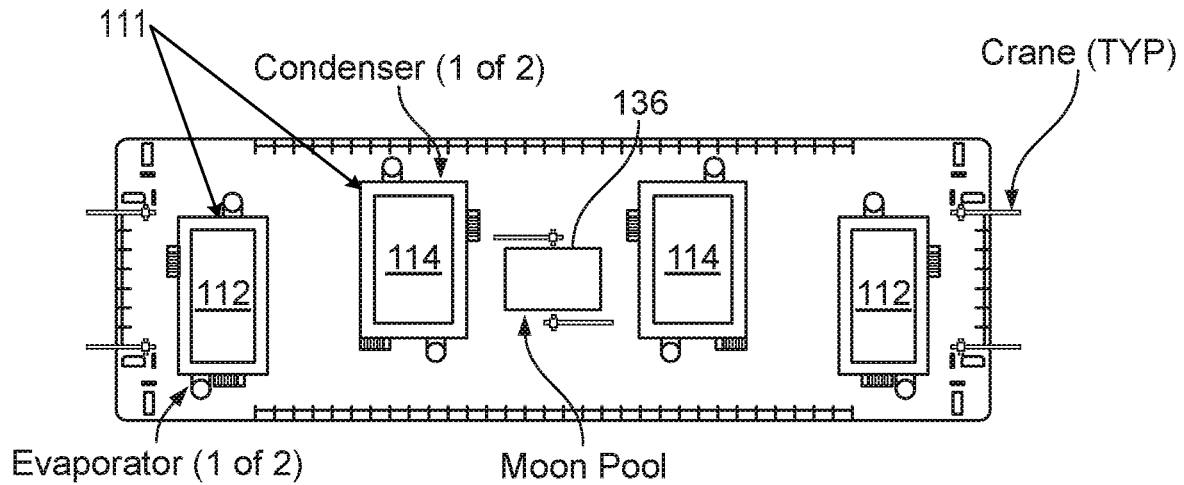
FIGS. 3 and 4 are plan views of the main deck and lower deck, respectively, of a barge-mounted OTEC plant including a moon pool.
Figure 4:
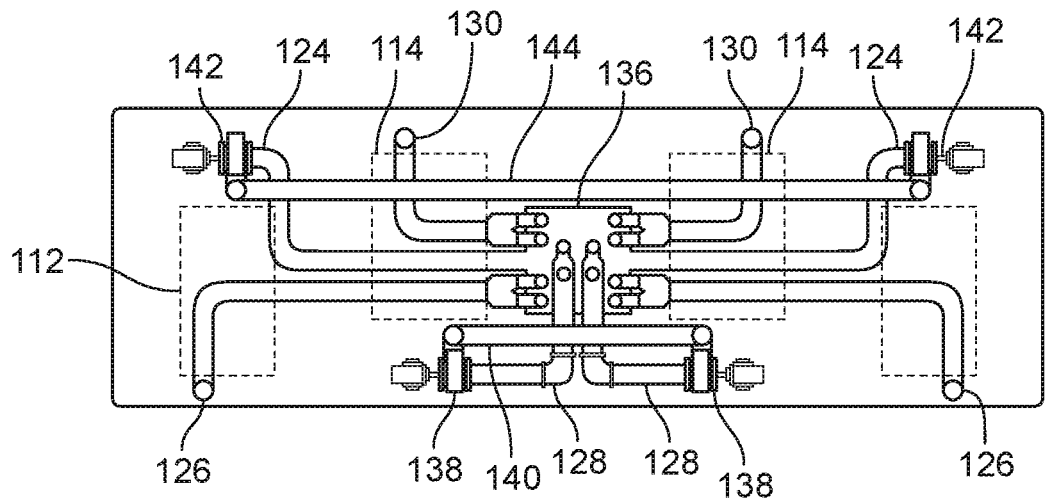
Figure 5:
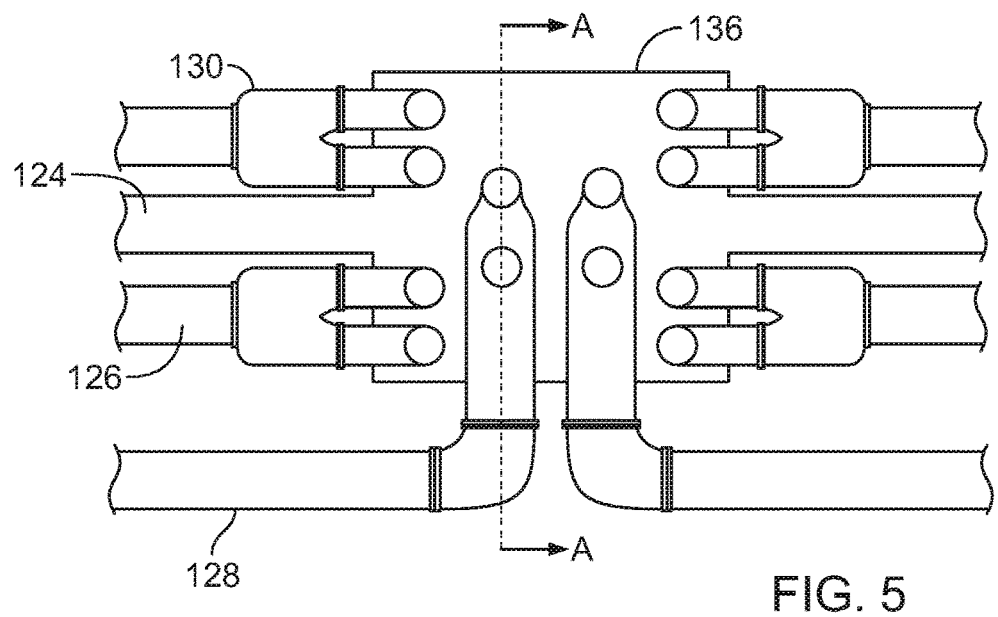
FIGS. 5-7 are diagrams of a portion of the piping of the barge-mounted OTEC plant of FIGS. 3 and 4.

Referring to FIGS. 1A, 1B, and 2, an exemplary vessel-mounted OTEC plant 100 includes mobile components and fixed infrastructure. The mobile components include, for example, a barge 110 and evaporators 112 and condensers 114 mounted on the barge 110. The fixed infrastructure includes, for example, mooring lines 116, mooring buoys 118, mooring system anchors 119, and a power cable 120. The following disclosure describes the OTEC plant 100 with mobile components attached to the associated fixed infrastructure. However, the mobile components of the OTEC plant 100 are detachable from the fixed infrastructure. This allows the mobile components the OTEC plant to be moved from the mooring site, for example, to perform maintenance in port or seek shelter from severe weather conditions.

The barge 110 is about 300 feet long, 90 feet wide with a variable draft of about 8 to 20 feet. The height above the waterline is about 23 to 35 feet. In the OTEC plant 110 illustrated in FIGS. 1A, 1B, and 2, the evaporators 112, the condensers 114, and other associated equipment are installed simply mounting the equipment on the barge deck without barge modifications. For near-coast installations, the barge 110 can be painted sea blue and white to reduce the visual signature. Other types and sizes of vessels and other paint schemes can be used.

The barge 110 is oversized in relation to its plant size in order to increase survivability in heavy storms and to provide space for equipment and personnel. Wind speed in the Caribbean Sea usually remains below 25 knots and wave action is relatively low, so the barge will provide a stable platform for operation in normal conditions. Similar conditions prevail around the globe between 20N and 20S, with some areas more susceptible to tsunamis than hurricane. The barge design is anticipated to be capable of surviving a mild tsunami because it will be moored close to where the pressure wave will build as it rises over the escarpment, and the mooring lines can take a 20 to 22 foot rise.

During exceptional storms and hurricanes, barge motions may exceed the 0.2 g acceleration operational limit for equipment and cause the plant to be shut down. In some cases, shock mounts can be included in the vessel design to increase this this limit and go as high as 0.3 g or higher.

The OTEC plant will be manned at all times except when personnel are moved ashore during hurricanes. The barge-based plant can remain on site during most hurricane scenarios. However, the mooring and pipe attachment configurations enable the barge to be detached and towed into safe harbor, if deemed necessary, prior to a very severe hurricane, then returned to site after the storm passes.

The evaporators 112 and the condensers 114 can be implemented using, for example, the heat exchange plates, cabinets, and systems described in PCT Applications PCT/US2013/065004, filed Oct. 15, 2013, PCT/US2012/050941, filed Aug. 15, 2012, and PCT/US2012/050933, filed Aug. 15, 2012 (attached hereto as an exhibit). In contrast to these systems, the evaporators 112 and the condensers 114 in the OTEC plant 100 are oriented for horizontal rather than vertical flow. The exemplary OTEC plant 100 houses a 4-stage hybrid heat exchange cycle 111 as described in PCT applications PCT/US2011/022115, filed Jan. 21, 2011 (attached hereto as an exhibit) and PCT/US2013/068894 filed Nov. 7, 2013. Other heat exchange cycles and plant configurations can also be used in a bottom founded OTEC plant.

The evaporators 112 receive warm seawater from warm water inlet piping 124, and discharge water to warm water discharge piping 126. The condensers 114 receive cooling water from cold water inlet piping 128 and discharge used cooling water to cold water discharge piping 130. In the barge-mounted OTEC plant 100 illustrated in FIGS. 1A, 1B, and 2, the warm water inlet piping 124, the warm water discharge piping 126, the cold water inlet piping 128, and the cold water discharge piping 130 are attached to fittings 132 mounted on the sides of the barge 110. The intake and discharge piping 124, 126, 128, 130 is described below in more detail.

Vessel-mounted OTEC plants are anticipated to generate 2.5 to 10 megawatts of electricity. The power cable 120 transfers generated electricity to an onshore interconnection facility tied into the onshore electric grid. The power cable 120 for the exemplary OTEC plant 100 is a 69 kilovolt 3-phase submarine power cable will be run from the barge 110 to the interconnection facility (not shown). In some markets the OTEC plant may transmit power to shore via a 34.5 kV 3-phase submarine power cable.

The interconnection facility is set back from the shoreline to reduce the likelihood of flooding and/or wave damage during severe storms. To protect both the power cable 120 and the near-shore environment, the power cable 120 can be installed in a conduit running through an 8-inch to 10-inch diameter hole bored from the interconnection facility, extending under the beach and the near-shore reef. In the exemplary OTEC plant 100, the hole and conduit extend for a total distance of approximately 1000 feet (e.g., up to 1600 feet) to a breakout point 134 (see FIG. 1B) of the bore-hole will be approximately 50 feet (or more) below the ocean surface. Seaward of the breakout point 134, the power cable 120 can be laid on the sea bottom and lightly covered with riprap or seamat. Alternatively, power cable 120 can be laid on the sea bottom and lightly covered with riprap or seamat all the way from the shoreline to where it lifts from the seabed to rise towards the barge 110.

The reef should be as narrow as possible at the selected location in order to minimize the distance of directional drilling underneath the reef for the power cable routing to the shore. The location should be away from residential properties and in proximity to the existing power distribution grid.

The submarine power cable, about 6 inches in diameter, will be run from the barge 110 to the seabed in a lazy wave catenary supported by floatation collars, touching the seabed at a depth of about 80 feet and running along the seabed to the ocean-end of the conduit.

The illustrated OTEC plant 100 has a single barge 110 and associated mobile equipment and infrastructure. In some systems, a single interconnection facility is connected to and controls multiple barges 110 and associated mobile equipment and infrastructure.

A battery energy storage system (BESS) can be installed at the interconnection facility. The BESS will be weather-tight, elevated and anchored against severe storms in accordance with local building code and good engineering practices. In some installations, a battery energy storage system is installed on the vessel.

Referring to FIGS. 3-7, some vessel-mounted OTEC plants 100 included a vessel (e.g., barge 110) that has a moon pool 136 through which seawater intake and return piping 124, 126, 128, 130 connect to the evaporators 112 and condensers 114. The moon pool 136 provides a protected source of warm surface water from which the thermal energy is extracted. Locating the moon pool 136 in the center of the vessel minimizes the magnitude of roll, pitch and yaw motion on the pipe connections and also reduces the impact of wave slap on these connections. The moon pool 136 shields warm water intake from surface debris and reduces need for screening. Cold water intake piping inlets can safely penetrate the walls of the moon pool 136 so that they can be below the water line, reducing the head pressure and pumping power requirements.

The seawater intake and return piping 124, 126, 128, 130 run below the main deck keeping the main deck clear for routine operations and maintenance. The cold water intake piping 128 leads to cold water pumps 138 which discharge to inlets of the condensers 114 located above on the main deck. Piping 140 provides a cold water cross connect between the condensers 114 such that either cold water pump 138 can be used to feed either or both condensers 114 (see FIG. 4).

The seawater intake and return piping 124, 126, 128, 130 run below the main deck keeping the main deck clear for routine operations and maintenance. The cold water intake piping 128 leads to cold water pumps 138 which discharge to inlets of the condensers 114 located above on the main deck. Piping 140 provides a cold water cross connect between the condensers 114 such that either cold water pump 138 can be used to feed either or both condensers 114 (see FIG. 4). Alternatively, a pair of high efficiency vertical turbine pumps lowered directly into the moon pool 136 from a framework above it can be used instead of the illustrated cold water pumps 138. Cold water discharge piping 130 leads downward from the barge 110 as described in more detail below.

The warm water inlet piping provides a hydraulic connection between the moon pool 136 and warm water pumps 142 which discharge to inlets of the evaporators 112 located above on the main deck. Piping 144 provides a warm water cross connect between the evaporators 112 such that either warm water pump 142 can be used to feed either or both evaporators 112 (see FIG. 4). Alternatively, a pair of high efficiency vertical turbine pumps lowered directly into the moon pool 136 from a framework above it can be used instead of the illustrated warm water pumps 142. Warm water discharge piping 126 leads downward from the barge 110 as described in more detail below.

Figure 6:
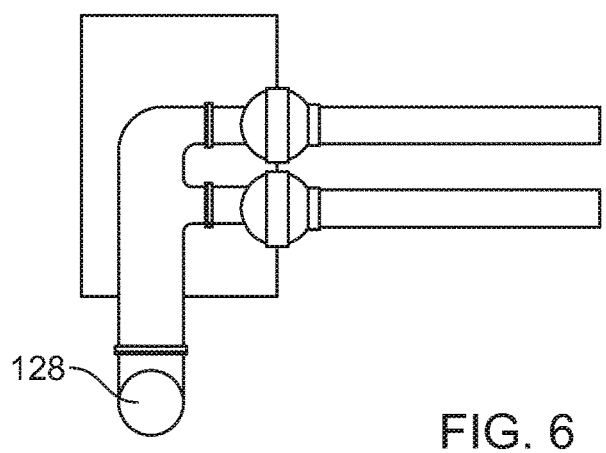
Figure 7:
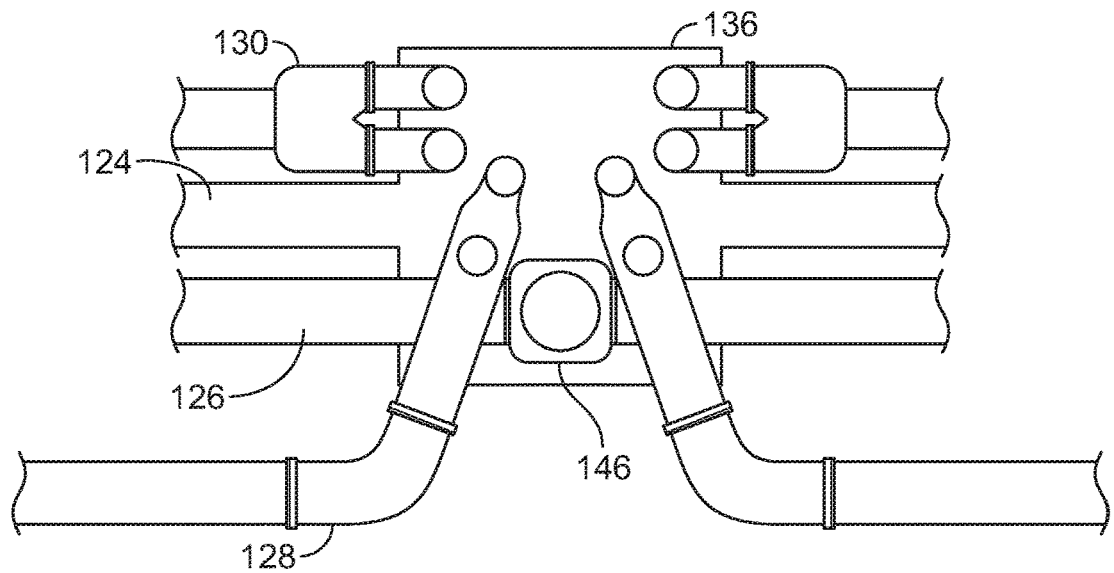

The seawater intake and return piping 124, 126, 128, 130 has been sized for a hypothetical 5 megawatt barge-mounted OTEC plant. This hypothetical plant includes 72 to 96 inch diameter primary piping within the barge but 48 to 54 inch diameter pipes leading to and from the sea (or the manifold) (see FIG. 5). The large diameter pipes can feed to and from smaller diameter pipes as illustrated in FIG. 6. Multiple pipes are an advantage since their reduced size requirement then falls within standard off-the-shelf polyethylene pipe sizes. Alternatively, the discharge piping can be combined in a single large pipe 146 as illustrated in FIG. 7.

In the hypothetical 5 megawatt barge-mounted OTEC plant, the heat exchangers (the evaporators 112 and the condensers 114) are installed in cold water and warm water chambers. Each chamber has a supply pump 142/138 and a discharge which uses commercial-off-the shelf 72 inch diameter polyethylene pipe The power turbines, ammonia pumps, and electrical gear are located on a deck above the water chambers, placing them about 18 FT above the water surface to protect them from possible seawater over-wash during storm conditions. Both the warm and cold water supply lines are cross-connected as described above for redundancy and to facilitate uninterrupted operation while maintenance is performed. In-line filters can be installed in the warm water intake lines but are not believed to be necessary for the cold water intakes Referring to FIGS. 8 and 9, a vessel-mounted OTEC plant 100 is configured to use bottom mounted manifolds 146, 148 which distribute: cold water flowing to the vessel 110; warm water and cold water being discharged from the vessel 110; and cold water being transferred from the vessel 110 onshore to provide seawater for air-conditioning. This OTEC plant 100 uses substantially the same mooring configuration discussed above with respect to FIG. 1.

Figure 8:
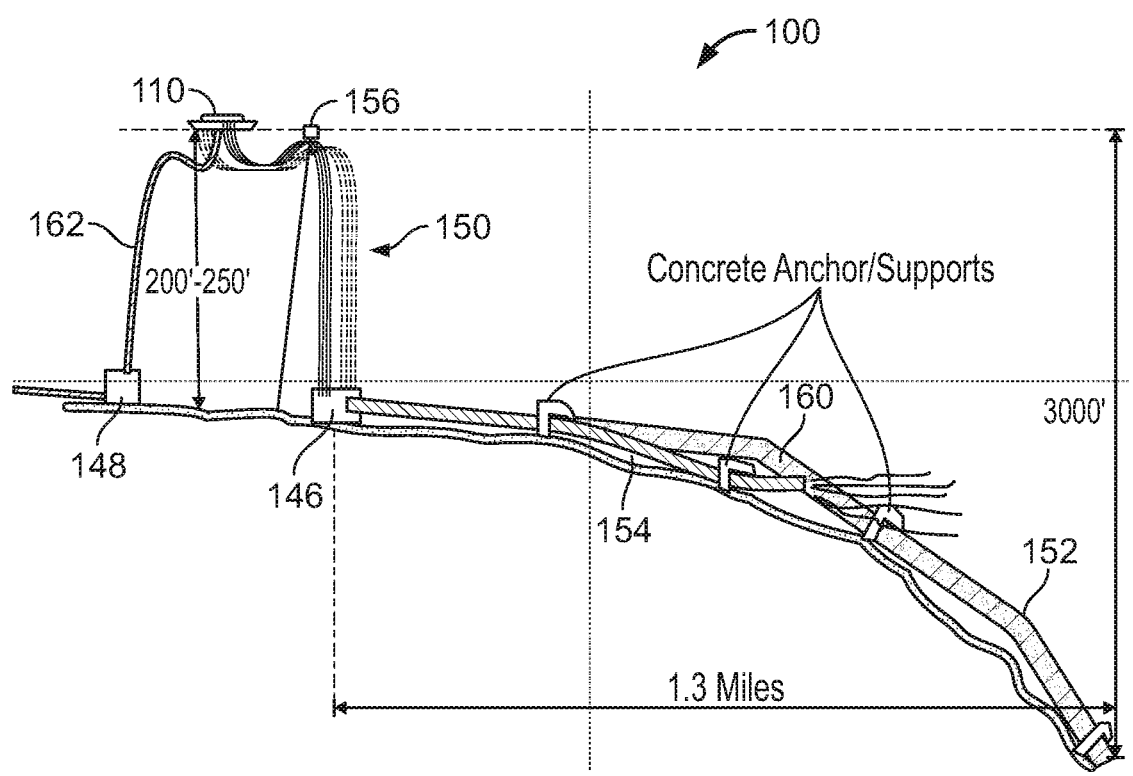
FIGS. 8 and 9 are schematics of an OTEC plant configured to provide onshore seawater air-conditioning.
Figure 9:
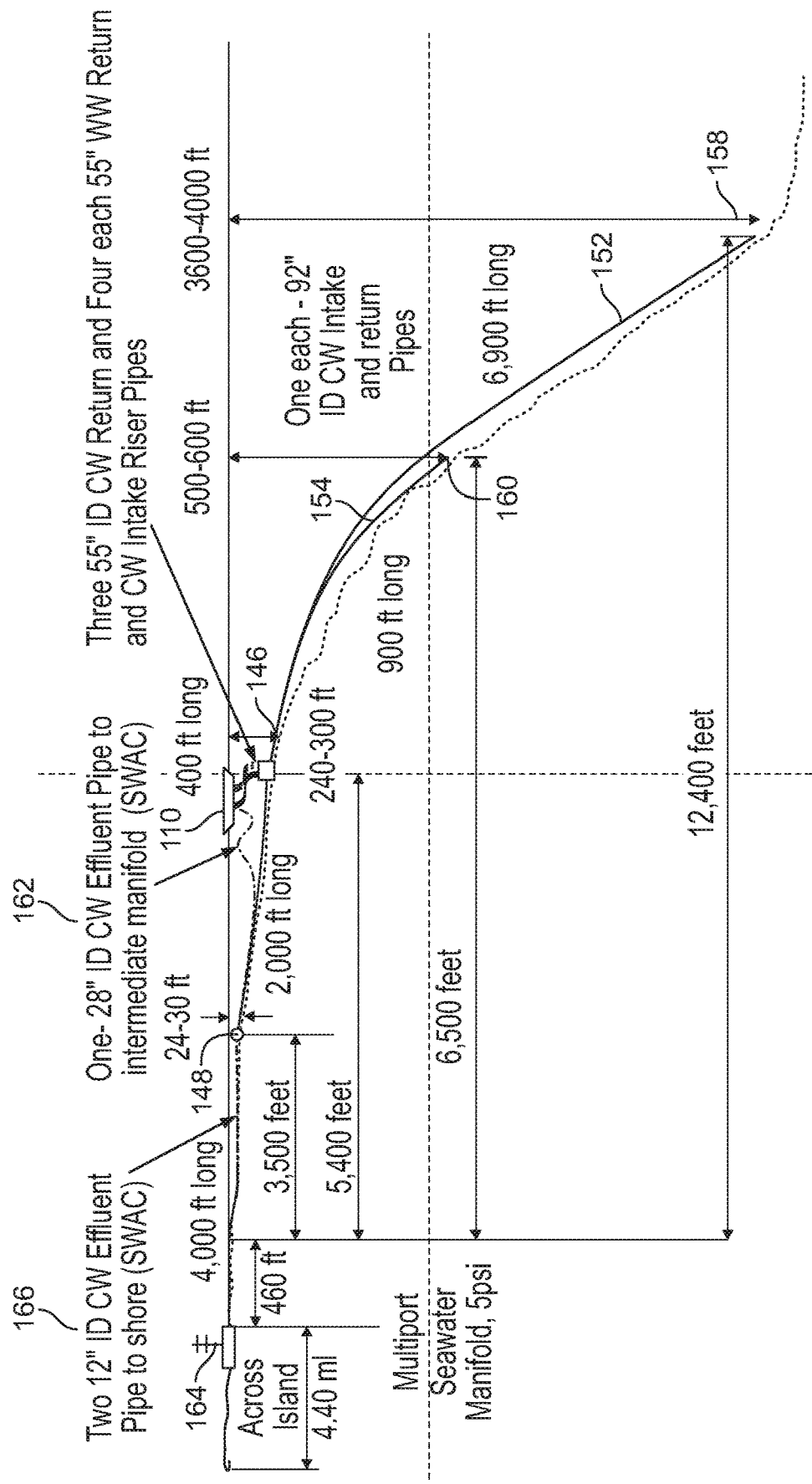

The OTEC plant 100 illustrated in FIGS. 8 and 9 has substantially the same barge layout as discussed above with respect to FIGS. 3 and 4. As discussed above, the stresses imposed on the pipe connections to the barge are reduced by running intake and discharge piping from a moon pool in the center of the vessel 110. The warm water discharge piping, cold water intake piping, and cold water return piping are provided by multiple, smaller diameter, more riser pipes 150 (e.g., flexible riser pipes) that run from the vessel 110 to concrete OTEC manifold 146 on the seafloor beneath the vessel. A large diameter cold water pipe 152 and separate warm and cold water return pipes 154 are also attached to the OTEC manifold 146.

Both the cold water and the warm water return pipes 154 run downward from the manifold along the seafloor in parallel to a depth, for example, of 400-500 feet. The discharge ends of the cold water return pipe and the warm water return pipe can be banded side-by-side and nozzled and/or louvered up and away from the sea floor so that the flows mix, reducing the likelihood of either thermal/nutrient contamination of the surface seawater or erosion of the sea floor. The cold water and the warm water return pipes 154 are anchored to maintain their positions relative to each and to the seabed. A plume study by Makai Ocean Engineering for the US Department of Energy titled, "Modeling the Physical and Biochemical Influence of Ocean Thermal Energy Conversion Plant Discharges into their Adjacent Waters," published in October 2012 and available on-line, shows that mixing the flows of return water can be beneficial.

A weighted collar or several weighted collars 156 are attached to these smaller diameter riser pipes such that the smaller diameter riser extend to the seafloor-mounted manifold in a lazy wave fashion that acts as a shock absorber to decouple the forces and motions between the pipes and the vessel. The multiple riser pipes 150 in each piping system also provide redundancy which increases operational reliability and flexibility. The riser pipes 150 can be manufactured of high-density polyethylene (HDPE) and are commercially available in the required diameters.

The cold water pipe 152 for the OTEC plant 100 runs from the OTEC manifold 146 along the sea floor to a depth of where water temperatures are consistently about 40 degrees Fahrenheit (e.g., ~approximately 3,800 feet on the north shore of Grand Cayman Island) and has a 96-inch inner diameter. The intake end 158 (see FIG. 9) of the cold water pipe 152 is modified (e.g., screened) to prevent the entrainment of any large marine animals by having an average inlet velocity of 0.5 feet per second. The cold water pipe 152 can be formed as described in PCT application PCT/US2013/065098 filed on Oct. 15, 2013. However, the manifold 146 is fixed in position and the cold water pipe 152 is disposed on the seabed and, optionally, covered with riprap. As the cold water pipe 152 experiences little to no stress at the connection to the bottom founded structure, lower cost HDPE for pipes material with up to 100 year service life can be used, Such pipes are currently commercially available.

In the illustrated OTEC plant 100, warm and cold water being discharged by the system are mixed at the outlet of the bundled warm/cold water return pipes 154. This mixing dilutes nutrients and lowers temperatures present in the warm water discharge. The bundled warm/cold water return pipes 154 run downward from the OTEC manifold 146 on the sea floor to a depth near the bottom of the photic zone (e.g., depth of ~400-600 feet). This approach avoids the turbidity and sea floor erosion issues that can be caused by pointing a separate warm water discharge straight down from the vessel 110 in relatively shallow water.

The depth at which dissolved oxygen is greatest, and where pelagic fish tend to school is referred to as the mixing layer in the ocean. Data collected over many months using the University of Hawaii's autonomous underwater data collection devices, SeaGlider 1 and SeaGlider 2, reveal the mixing layer to be between 130 and 160 meters deep. The nutrient rich, cold water pumped from 3,700 feet or deeper is denser than the surface seawater as will tend to descend rather quickly until the water is fully assimilated in the surrounding ocean water. In the OTEC process, the water temperature will be raised by about 10 degrees F. but there will be no chemical changes. The warm surface water will exit the OTEC system about 10 degrees F. cooler than it entered. It needs to be returned to the ocean at a depth that assures that it will not rise and contaminate the surface water thereby affecting the power plant output capability. By returning the cold deep seawater and the warm surface seawater at the same depth, several meters above the mixing layer, the OTEC plant works to rapidly restore balance to nature by a) mixing the output so that the condenser return water mixes with and cools the evaporator return water, b) the nutrients in the condenser return water are diluted by the evaporator return water, and c) the now denser mixed return water will tend to descend more rapidly as it assimilates into the surrounding ocean water. This assimilation will occur in the mixing layer where the nutrients, now diluted, are expected to enhance the production of food for pelagic fish, thereby increasing their number in the immediate area.

The discharge ends 160 of the bundled warm/cold water return pipes 154 are directed upwards away from the seabed and can include a nozzle or a diffuser. This approach can avoid the turbidity and sea floor erosion issues that can be caused by laying the return pipes on the sea floor to discharge parallel the sea floor. Some OTEC plants 100 are implemented with a combined warm/cold water return pipe rather than separate cold water and warm water return pipes 154.

A similar approach is used to provide condenser effluent from the OTEC plant 100 to be used onshore for seawater air conditioning (SWAC). The SWAC manifold 148 is positioned between the vessel 110 and the shoreline in approximately 24 to 50 feet of water. A condenser effluent line 162 routes a portion of the condenser effluent produced by the OTEC plant 100 to the SWAC seachest manifold 148. A pipe or pipes extends from the SWAC seachest manifold 148 to a pipe manifold that is located onshore. A booster pump on the OTEC plant and powered by a variable frequency drive receiving a control signal from the manifold on shore maintains constant delivery pressure at the manifold.

A hypothetical SWAC system was designed that included a single, 20-inch inner diameter HDPE pipe 162 extending from the vessel 110 to the SWAC manifold 148 in approximately 24 to 30 feet of water. Two 12-inch inner HDPE pipes 166 extend from the SWAC manifold 148 to a concrete discharge basin 164 planted in ground onshore. The two 12-inch inner HDPE pipes 166 pass under the beach in bore holes made by horizontal directional drilling. Pumps co-located with the basin 164 transfer water from the SWAC manifold 148 to the basin 164. Further pumps and piping are used to transfer cold water to facilities being cooled.

The platform will be moored in 150 to 300 feet of water, which is relatively shallow (mooring in thousands of feet of water is presently considered routine). A standard eight-point moor will be employed. Each mooring line is attached to a stand-off buoy for ease of attachment and detachment. Alternatively, each mooring line is attached to a constant tension mooring winch mounted on the deck of the OTEC plant. Mooring anchors will likely be gravity, embedment or drilled, depending on sea floor composition and emplacement costs. All options are well understood in the industry. Sea floor composition will be determined through on-site surveys including core samples.

Figure 10:
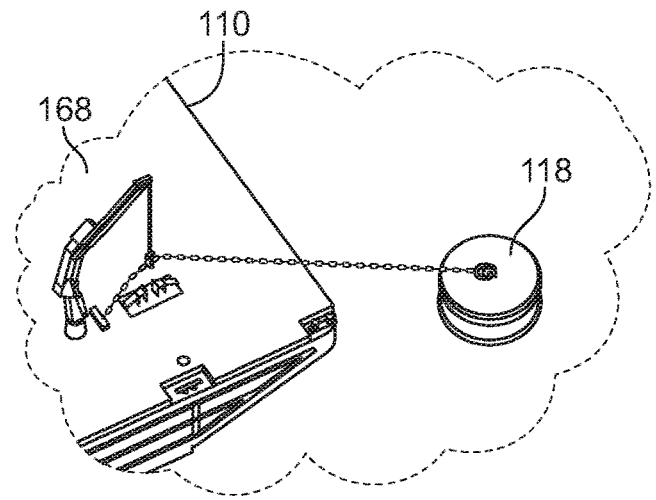
FIG. 10 is a perspective view of a portion of the mooring system.

Referring to FIG. 10, the vessel 110 has small knuckle-boom cranes 168 installed so that the barge can be moored/unmoored without external assets. Terminal mooring interface is via simple deck-mounted chain plates. These onboard cranes should also be helpful in general cargo handling and transfer during normal operations.

Figure 11:
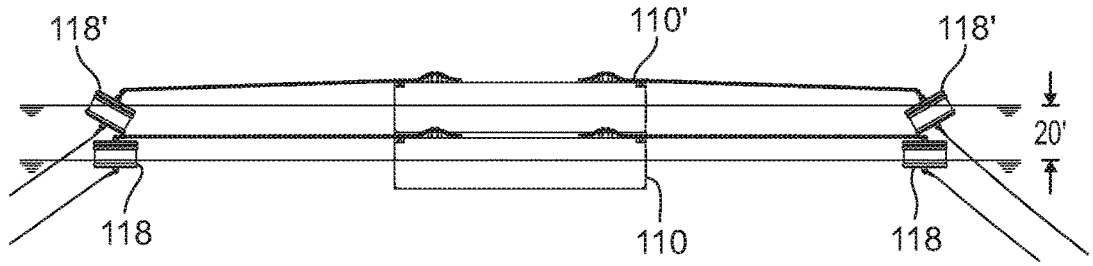
FIG. 11 is a schematic illustrating adjustments of a mooring system with changing sea level.

Referring to FIG. 11, the mooring system dynamically adjusts to changing sea level as may be necessary to compensate for the storm surge associated with severe storms or tsunamis. Storm surge is a rise in sea level produced by a combination of the wind, tidal, and pressure effects. As it is typically reported for hurricanes, storm surge usually includes the added surface waves. A storm surge of 20 feet will submerge a land mass which is 20 feet above sea level. Storm surge affects a fixed mooring differently than do open water waves. A mooring can be designed to accommodate the vertical motion of the moored barge by the action of the tension bar buoys. While this accommodation does put small additional loads on the mooring gear, storm surge does not create a horizontal load on the barge as do wind, waves, and current. As the storm surge arrives, the barge 110 lifts from its initial position to a relatively higher position (e.g., barge 110'). The mooring buoys 118 also lift to a relatively higher position (e.g., buoys 118'). The mooring buoys 118 rotate and are partly submerged as lifting of the barge (110>110') takes slack out of the mooring lines. The rotation and submergence of the mooring buoys acts to increase the effective length of the mooring legs as shock absorbers to reduce surge loads.

Figure 12:
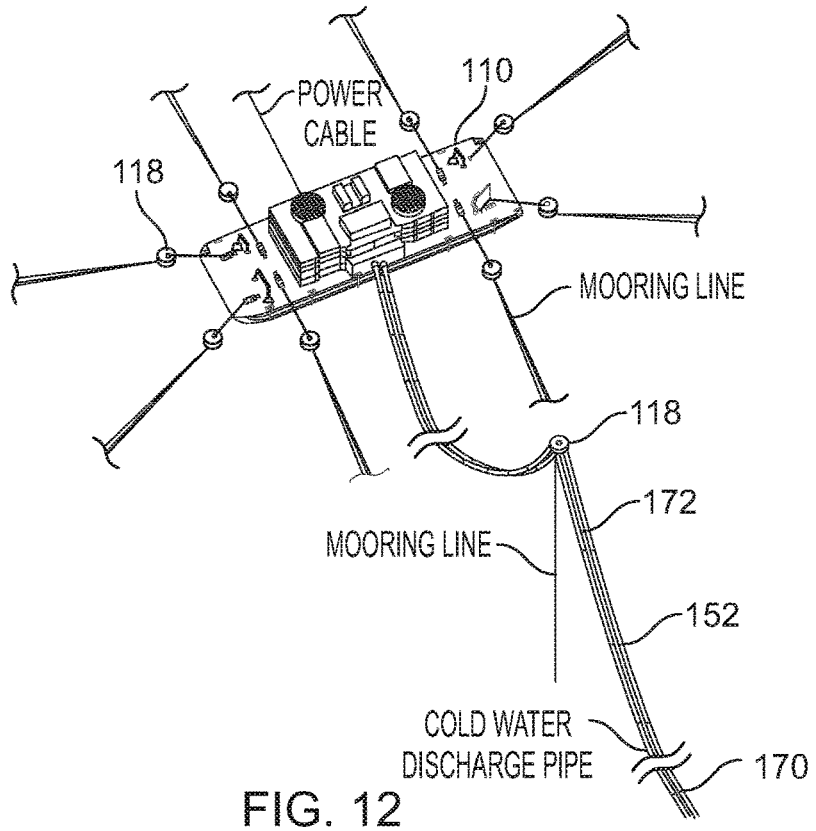
FIG. 12 is a perspective view of a mooring system and cold water pipe configuration for a barge-mounted OTEC plant.
Figure 13:
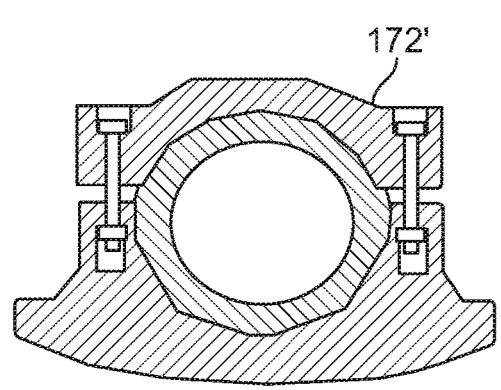
FIGS. 13 and 14 are end views of collar anchors for piping.
Figure 14:
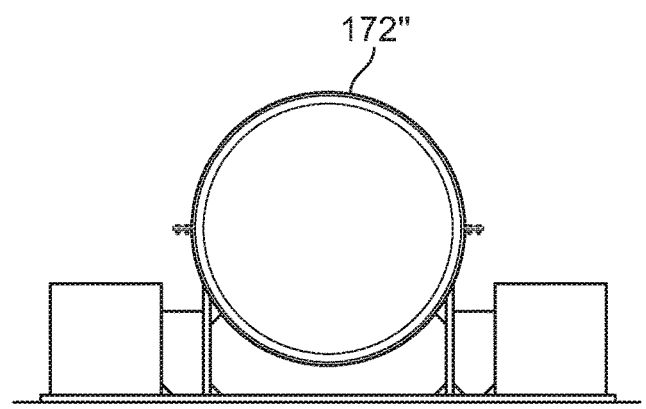

FIG. 12 is a perspective view of a mooring system and cold water pipe configuration for a barge-mounted OTEC plant. This specific interface of the mooring and water pipe systems is configured for a proposed location on the coastal shelf off of Cape Eleuthra. The mooring legs can be of quite different lengths and angles as required to interface with the specific bottom topographies. The cold water pipe 152 is secured/moored using gravity anchors 170 of 4000 LB submerged weight spaced every 130 FT. Cost is reduced by using magnetite sand (specific gravity=5) in steel boxes to achieve the required mass. Since the cold water pipe is slightly buoyant at 15 pounds per foot of pipe, weighted collars 172 are utilized to achieve the catenary curves shown. The weighted collars can be, for example, concrete anchors 172' (see FIG. 13) or fabricated steel gravity anchors 172" (see FIG. 14).

Figure 15:
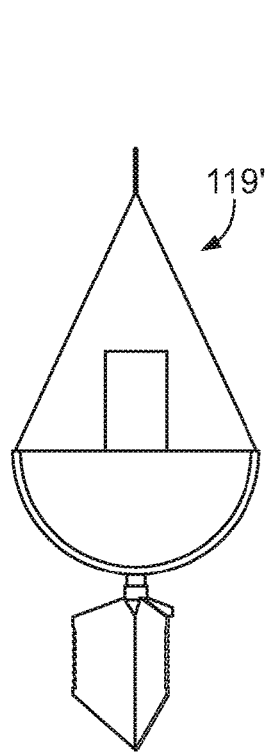
FIGS. 15-17 are schematic views of mooring system anchors.
Figure 16:
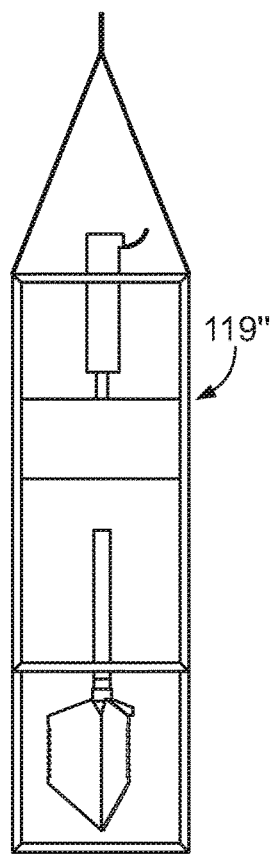
Figure 17:
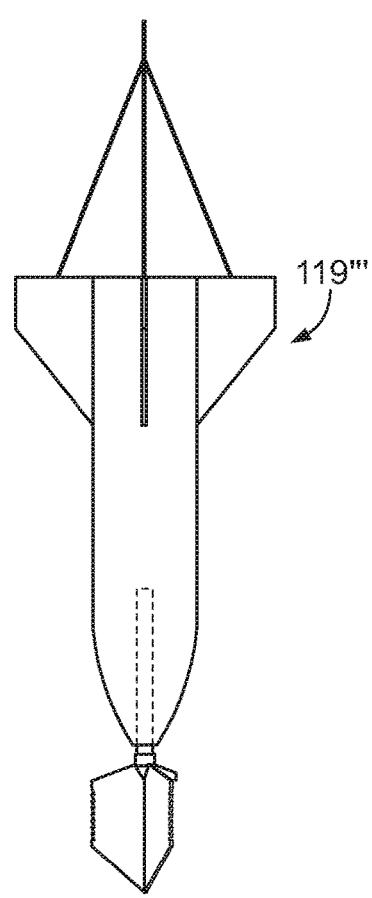

FIGS. 15-17 are schematic views of mooring system anchors 119', 119", 119'". The anchors will be more reliable if placed, for example, in mudstone or coral. The mudstone is similar in properties to sandstone and the coral is similar in properties to limestone. Both substrates are very suitable for properly designed embedment anchors.

The anchors 119 can be installed, for example, using an explosive embedment method, a bottom sitting hydraulic pile driver device, and/or a gravity driver system with a heavy, retrievable torpedo weight to drive the anchor in. Small barge-mounted cranes of multi-hundred ton capacity are in wide use in coastal and offshore work and readily available to install the anchors 119. Some barge cranes simply use a land-based crawler crane installed on the barge. A 100-ton crane could also be installed on the barge 110 temporarily, or permanently and used for operational cargo transfers.

Figure 18:
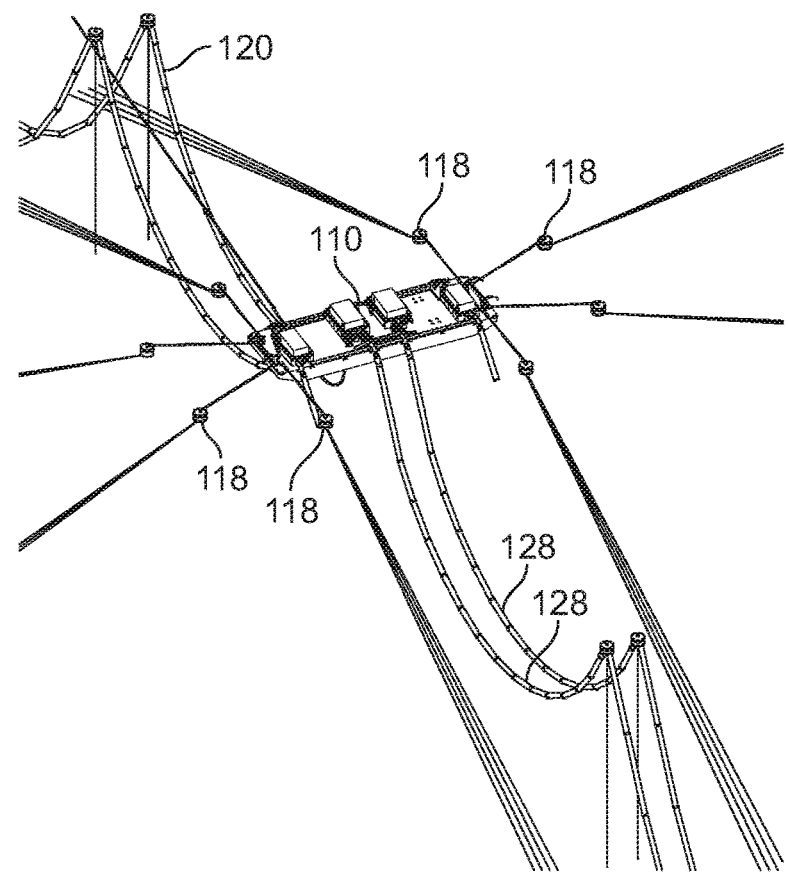
FIGS. 18 and 19 are, respectively, a perspective view of an OTEC plant and a side view of the associated power cable mooring system.
Figure 19:
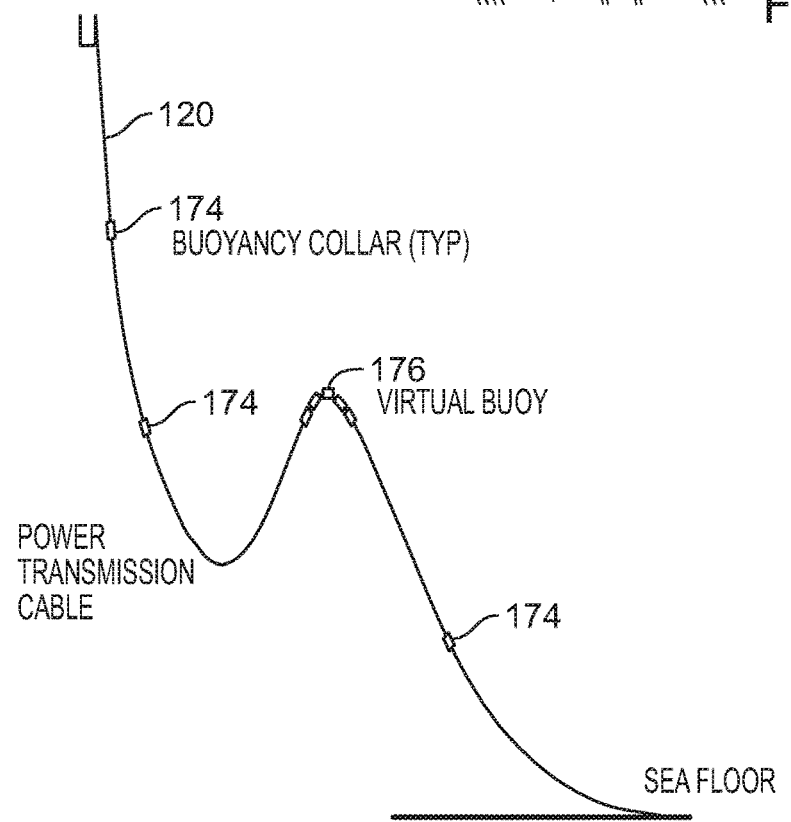

FIGS. 18 and 19 are, respectively, a perspective view of a barge mounted OTEC plant 100, and a side view of the associated power cable mooring system. The exemplary power cable mooring is a buoy-supported lazy wave design that includes buoyancy collars 172. Several buoyancy collars can be grouped together to form a virtual buoy 176. For typical sites, the power cable run to shore will be in relatively shallow water and the power cable 120 will be typically protected and anchored by rock cover. Routing through coral reefs or beach littorals will be via directionally drilled tunnels. The barge 110 has eight chain legs running to tension bar buoys 118. These buoys 118 provide some load attenuation in the mooring legs and also maintain the mooring system in place if the barge is disconnected. The mooring legs continue with multiple lines of 2-inch diameter polyethylene (PE) line, either four or three per leg as required to meet load requirements. The PE mooring lines each terminate with a single emplaced embedment anchor as described above with respect to FIGS. 15-17.

Figure 20A:
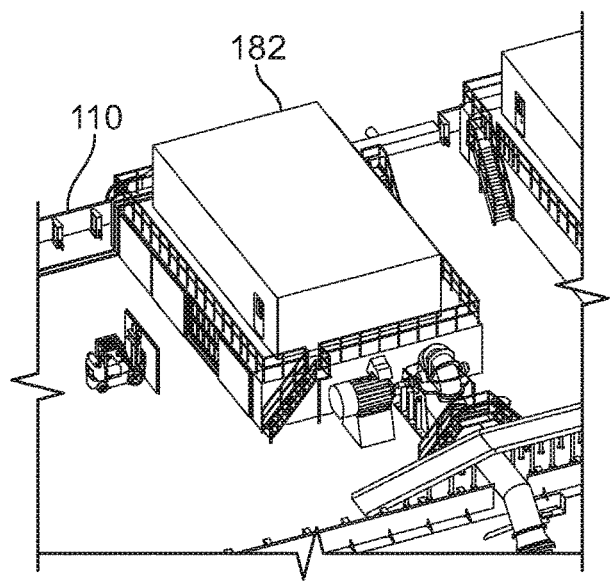
FIGS. 20A-20C illustrate access procedures for heat exchangers on a barge mounted OTEC plant.
Figure 20B:
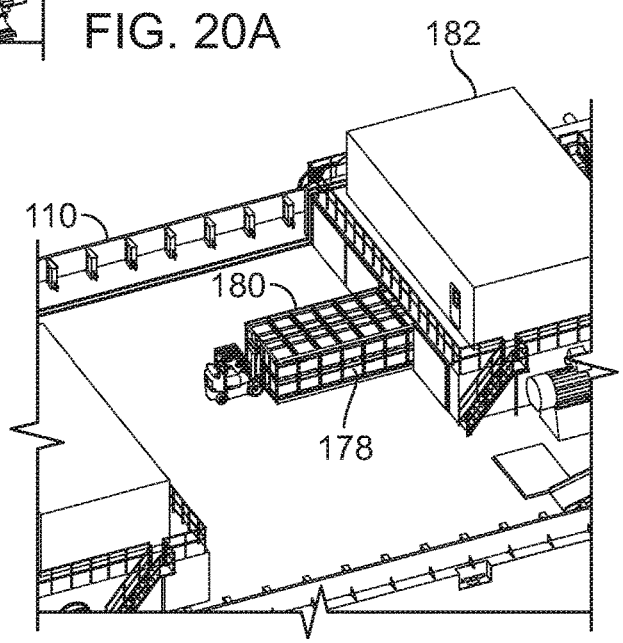
Figure 20C:
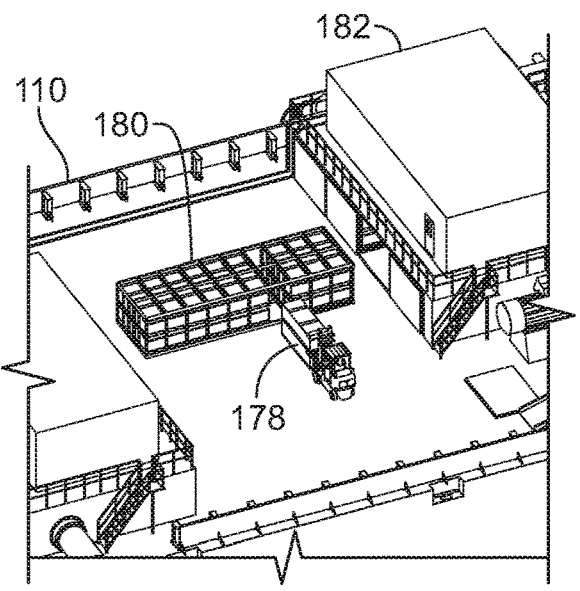

Referring to FIGS. 20A-20C, power plant systems are readily supported on the upper decks of the HX chambers since the chambers are positive pressure and the structure is commensurately strong. The heat exchanger plates are assembled as modules 178 of 84 plates. These modules are readily handled by a small forklift. The modules are installed in a rack 180 which slides in and out of the water chambers 182 (e.g., evaporator 112/condenser 114), providing access to the heat exchange modules. All husbandry of the heat exchange system is accomplished from the deck of the barge using conventional material handling equipment.

The heat exchange modules can be removed from the racks for inspection, repair or replacement. The simple nature of the water chambers allows for all module-to-module plumbing to be accomplished inside the chamber prior to installing the hatches. Thus, the hatches do not require through-fittings for the ammonia piping.

Figure 21A:
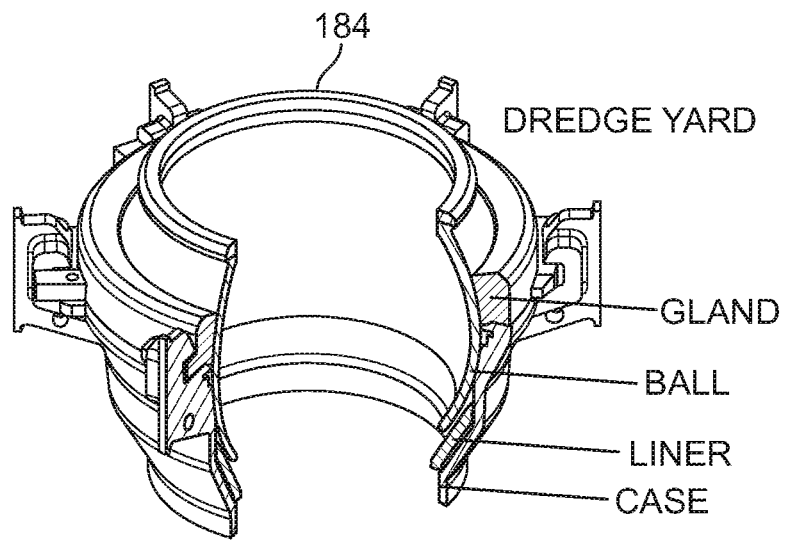
FIGS. 21A and 21B are, respectively, a partial cutaway view and a side view of a cold water pipe connection.
Figure 21B:
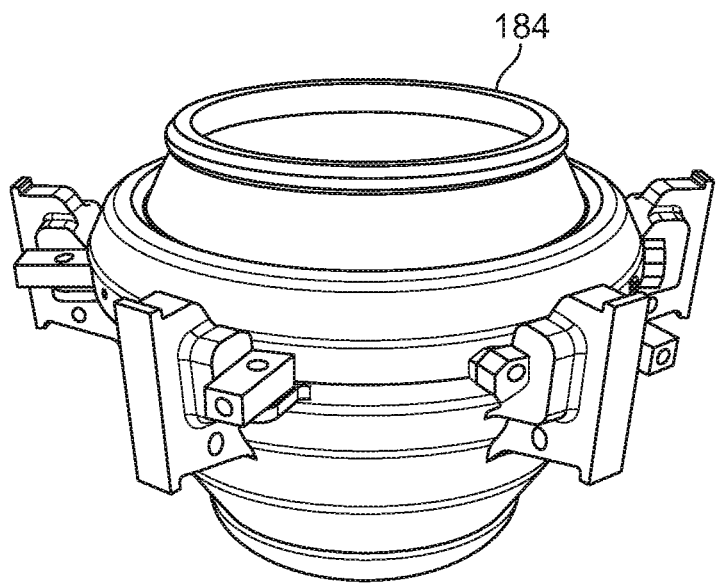

FIGS. 21A and 21B are, respectively, a partial cutaway view and a side view of a cold water pipe connection valve 184 (a Dredge Yard 48" ID quick-connect ball valve fabricated for the dredging industry). The 48" diameter matches the pump inlet diameters and is adapted up to the 63" pipe ID or larger. In some systems, e.g., systems that do not include the seabed installed manifold, the cold water pipe can be connected to the barge pumps with a limited motion ball joint as the cold water pipe connection valve 184. This joint is principally to isolate the cold water pipe from short period, small amplitude roll and pitch motions. The larger and slower motions of surge, sway, and heave are absorbed in the loop of the flexible high density polyethylene (HDPE) cold water pipe.

In systems with the seabed manifold, the small diameter water pipes will connect to the barge pumps and discharges with commercial off-the shelf ball joints. This joint is principally to isolate the pipe from short period, small amplitude roll and pitch motions of the barge. The larger and slower motions of surge, sway, and heave are absorbed in the loop of the flexible PE pipe located between the barge and the pipe buoys.

Figure 22:
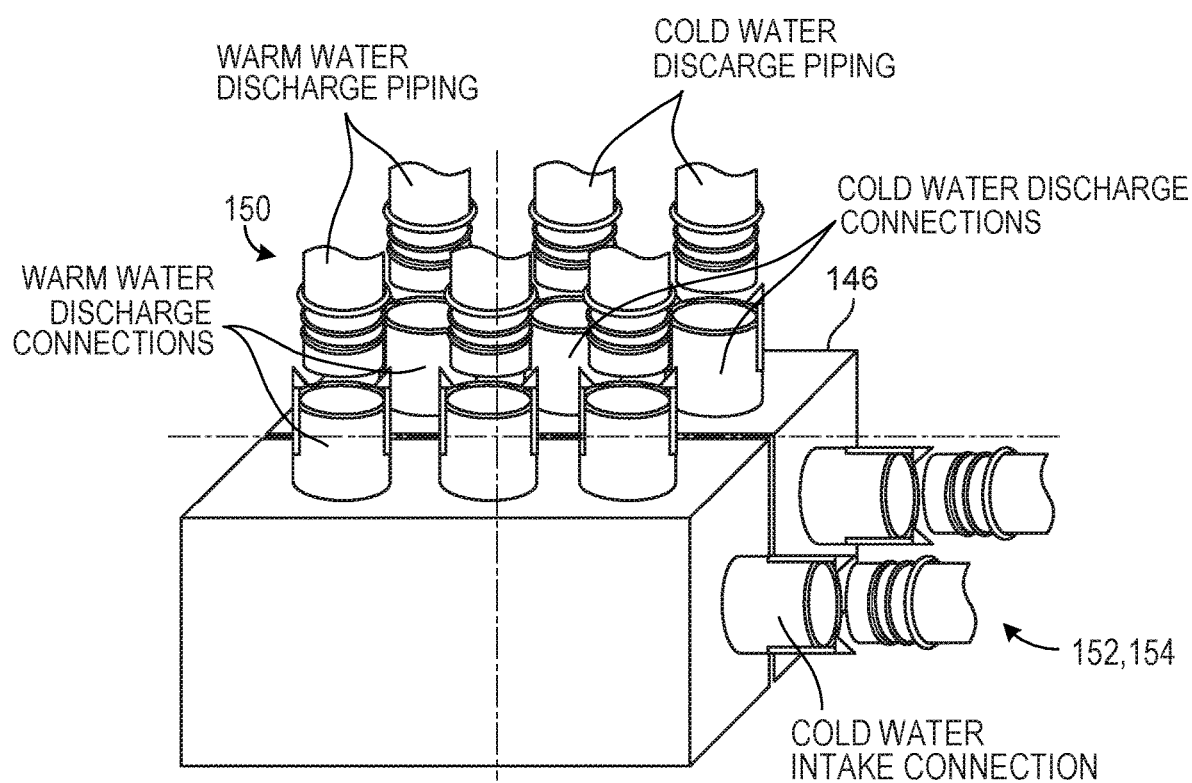
FIG. 22 is a perspective view of a cold water pipe intake and return manifold.

FIG. 22 is a perspective view of a cold water pipe intake and return manifold 146. The manifold 146 includes o-rings and retainer blocs. The end of the pipe is prepared with o-rings and retainer ring and then the blocs are bolted to the outside of the receptacle, sealed in the manifold FIGS. 23A-23D illustrate a barge 110 that is 206 feet long, 139 feet wide, and 28 feet in height. The barge 110 includes a moon pool 136 located between evaporators 112 and condensers 114. The principal equipment on the deck is the heat exchanger system. The HX arrays are supported in racks and enclosed in water chambers that allow for the flow of warm and cold water over the interconnected HX cartridges to accomplish the gasification and condensation of the ammonia working fluid contained within the cartridges. The deck installations also include ammonia storage tanks, habitation modules, and cargo handling gear.

Figure 23A:
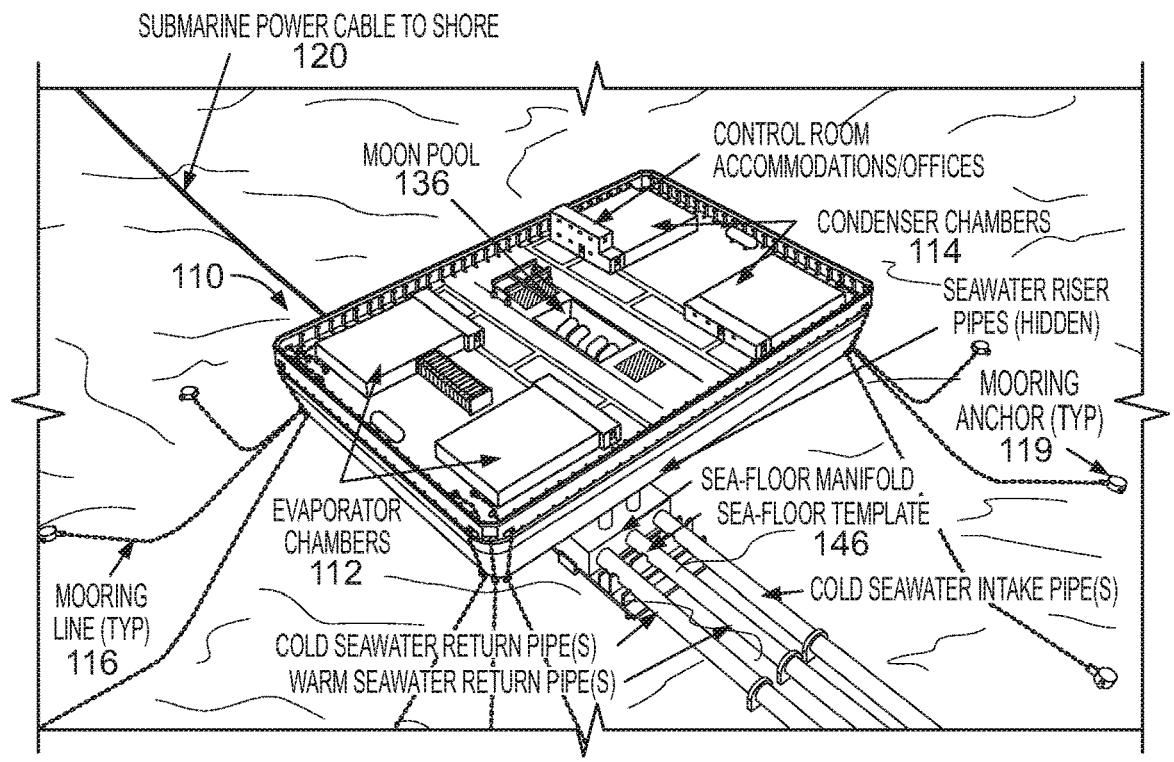
FIGS. 23A-23D illustrate a barge-mounted OTEC plant.
Figure 23B:
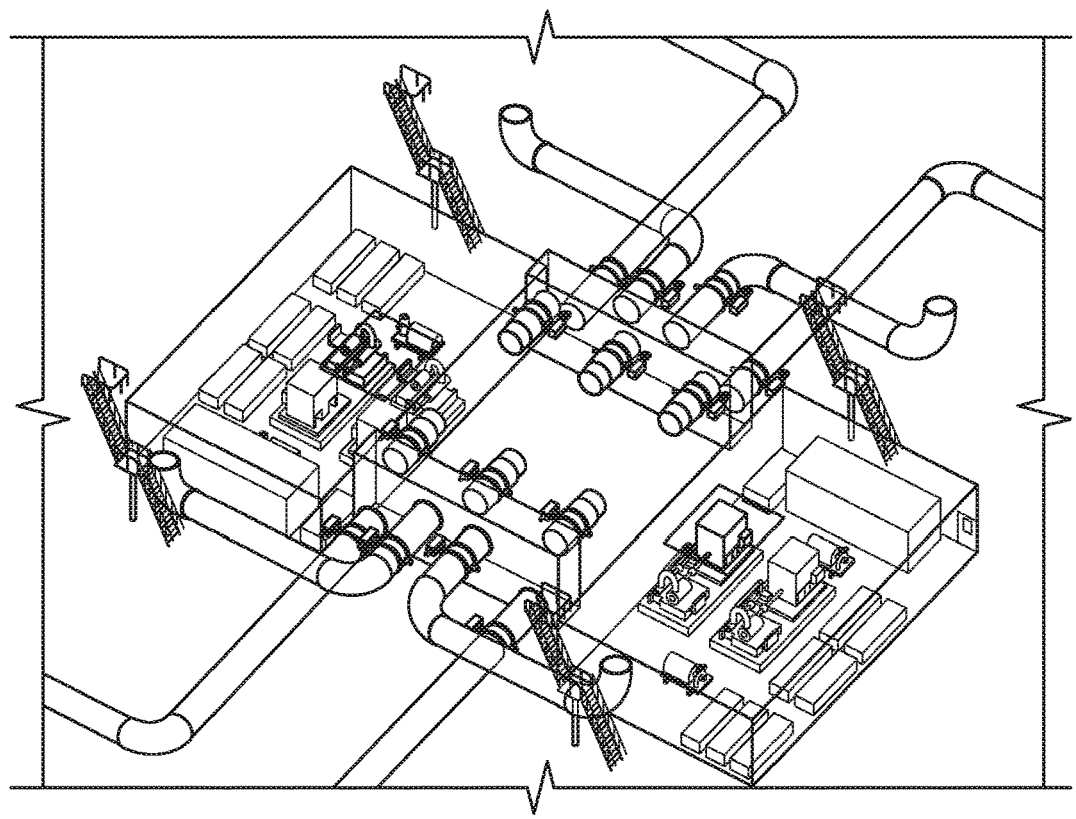

In this embodiment, the evaporators 112 and the condensers 114 are located at the corners of the barge 110 and systems with moving mechanical parts such as generators and turbines are located towards the center of the barge 110. FIG. 23B illustrates the location of such systems. The power plant machinery is located amidships port and starboard of the moon pool. These spaces contain the four turbines, ammonia pumps, and associated controls and switch gear that comprise the power generation system. In addition to personnel stairwells and the gantry crane hatches, the machinery spaces will also be served by freight elevators. The machinery is located as close to the center of the vessel as possible where the acceleration due to motion is the least. Scale model testing shows these accelerations to be less than 0.2 g even in the worst storm conditions. This configuration places high mass components with few or no moving parts on the portions of the barge 110 that experience the highest accelerations as the barge 110 pitches and/or rolls.

The heat exchanger cartridges are interconnected in arrays which are themselves installed in racks which slide in and out of the water chambers. The ammonia piping is connected inside the chambers before the chamber side hatches are installed and feeds down to the power plant system below decks. The HX arrays are serviced by sliding racks out of the chambers where individual arrays can be serviced or replaced. The deck arrangement allows the cold water chambers and warm water chambers to share a maintenance deck area and minimize the overall platform size. The HX array racks are slid out of the water chambers through removable closure hatches. The HX arrays, comprising 84 Heat Exchanger cartridges permanently installed in a housing cocoon, can then be removed individually.

The moon pool serves as the connection point between the platform and the cold and warm water supply and return pipes. The use of a moon pool allows this critical connection to be located at the point of least platform motions and to be protected from wave impacts and collisions. It also allows the piping runs to be well away from the mooring system chains. The incorporation of an organic gantry crane over the moon pool assists in the installation and maintenance of the water piping and seawater pump systems. The gantry crane also services two large deck hatches located over the machinery spaces and allows for machinery and supplies to be moved from the platform deck to the below-decks spaces. The crane the ability to overhang the platform deck and to offload general cargo from supply boats of convenience.

The platform perimeter bulwark is intended to protect the deck from green water during storm conditions and also to screen the deck machinery and activities from view of off-platform persons and provide for an esthetic visual signature. The bulwarks have removable panels at the corners for installing the mooring chains. The bulwarks incorporate sliding hatch amidships so that cargo can be easily transferred from supply boats to the barge 110. The bulwarks have drainage gaps at their deck connections.

The mooring chains extend downward from bottom corners of the barge 110 rather than to can buoys. Tests using 1/35 scale models indicate that this configuration can be used in low wave environments such as, for example, on the leeward side of islands. The can buoy mooring configuration provides additional flexibility and may be required in higher wave environments such as, for example, on the windward side of islands.

Figure 23C:
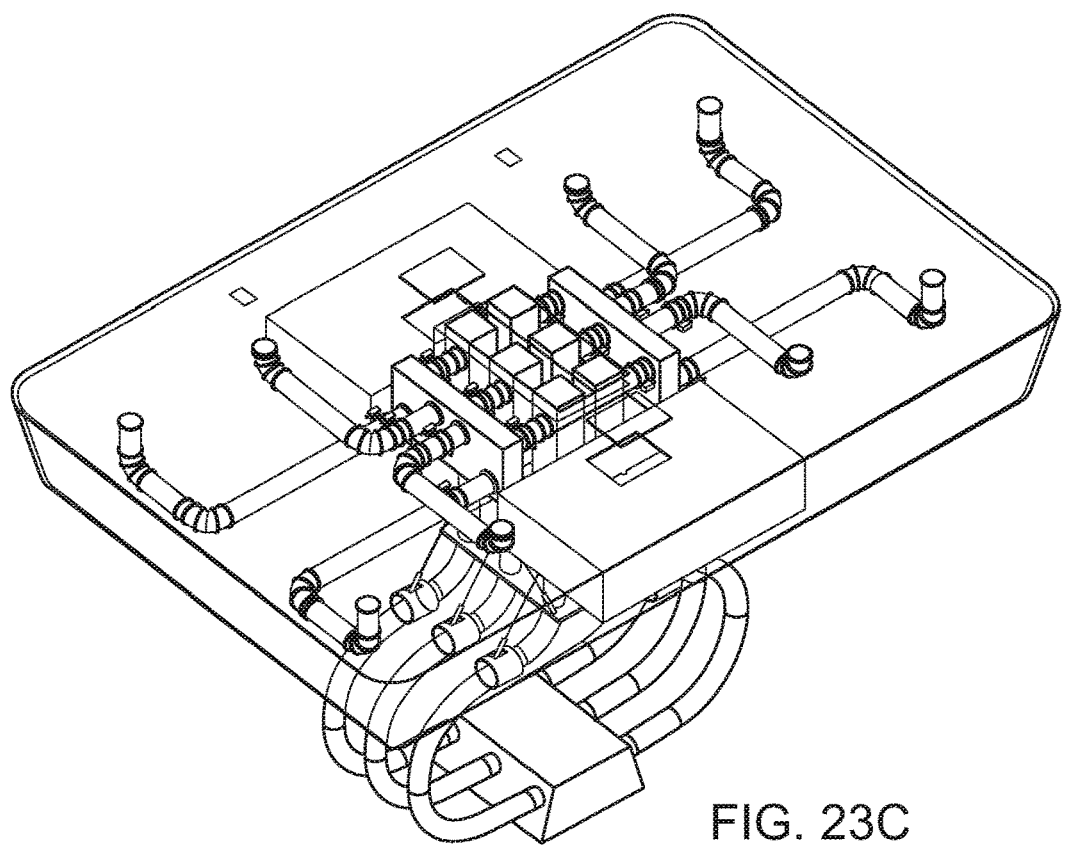

FIG. 23C illustrates the arrangement of pumps and piping. The cold seawater and warm seawater vertical axis pumps are located in dry chambers extending out from the moon pool wall with connections to the underwater piping and intakes. Space has been allocated for pump isolation valves and manifolds that will allow for redundancy in sewater service. The steel distribution piping runs below deck and feeds directly into the water distribution plenums located at the ends of the HX chambers. The return piping is fed directly from the water return plenums located at the ends of the HX chambers. The piping manufacturers can supply segment-welded piping turns as required for the installation.

Figure 23D:
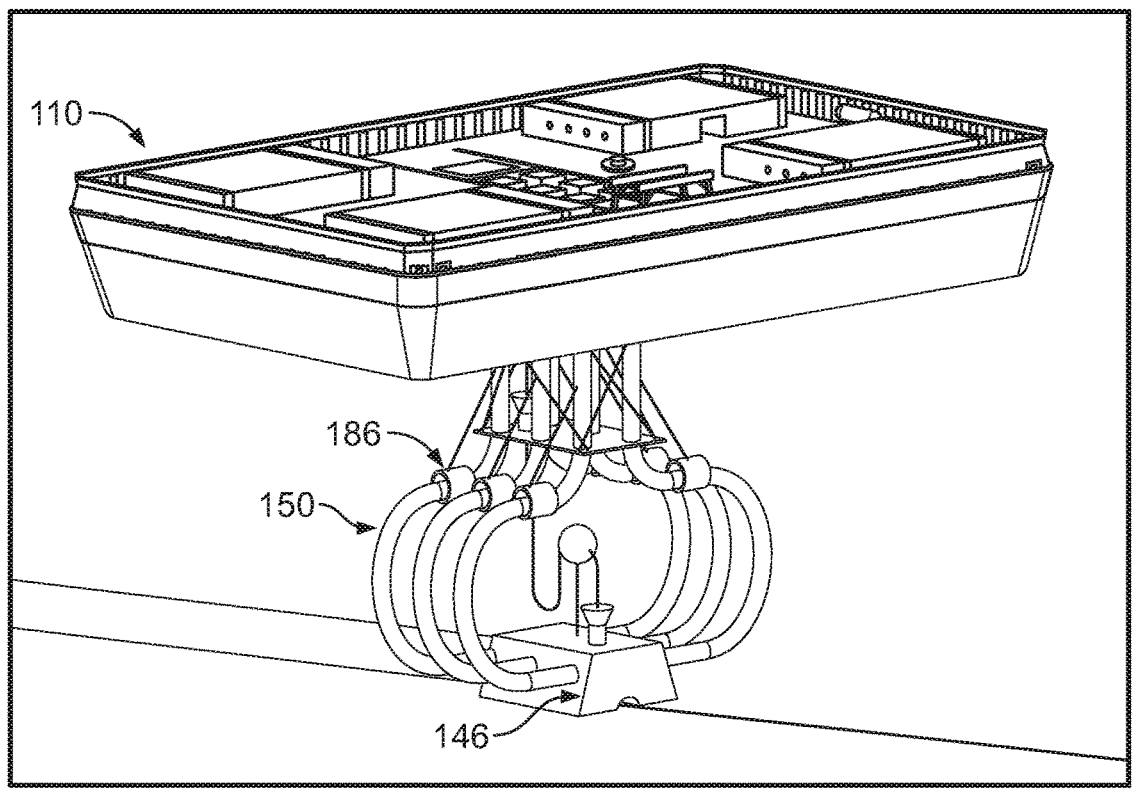

FIG. 23D illustrates the cold and warm water external piping. The external supply and return pipes are connected to the internal pumps and pipes through welded fittings at the moon pool wall. Flexible, strong suction dredge hose then connects to a seabed manifold located directly beneath the moon pool. The concrete manifold merges the flexible hose into the large seabed-supported 84" diameter cold water supply and cold and warm water return pipes. The seabed pipe can be double wall spiral-rib type HDPE.

Rather than rising from the OTEC manifold 146 to the barge 110 in a lazy wave as illustrated in FIGS. 8 and 9, each riser pipe 150 is separated into two sections that form a loop. The two sections are joined by tension/shear/torsion (TST)-constrained flexible joints 186 developed for this system. An embodiment of these joints is discussed in more detail below with respect to FIGS. 24A and 24B. This piping configuration accommodates platform motions relative to the fixed seabed manifold. Platform motions during the 99$^{th}$ percentile operational weather are expected to be on the order of a few feet in surge/sway/heave and tenths of a degree in roll/pitch/yaw. The pre-tensioning of the mooring chain system significantly ameliorates platform motions during all weather conditions. The maximum surge and sway motions expected during hurricane conditions are 15 FT and maximum heave is 10 FT. The flexible connection system must accommodate these motions without undue loading on the piping and piping connections. The piping support platform are guyed to the platform so that the loads are taken by the cables and structure and not by the vertical steel pipes connecting to the platform.

Figure 24A:
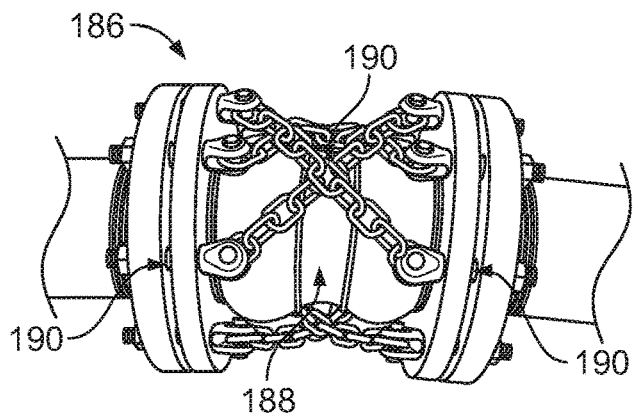
FIGS. 24A and 24B illustrate a joint.
Figure 24B:
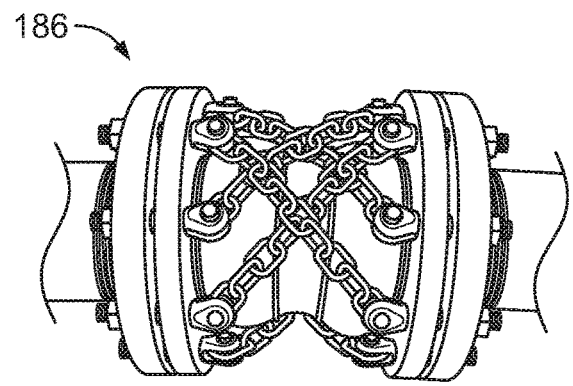

FIGS. 24A and 24B show a TST-constrained flexible joint 186 limiting tension and torsion, respectively. In this embodiment, the TST-constrained flexible joint 186 includes a flexible rubber element 188 between two flanges 190 to contain the seawater and to resist joint loads in compression. The rubber element 188 is surrounded by a mesh formed of flexible chains 192 that resist joint loads in tension, shear, and torsion. The chains are interwoven and attached by bolts screwed into the flanges 190. The number and orientation of the chains can control the directions and extent of joint flexibility. The rubber element 188 is molded in a desired shape based on the joint application and the chains are oriented based on desired directions of joint flexibility.

Figure 25:
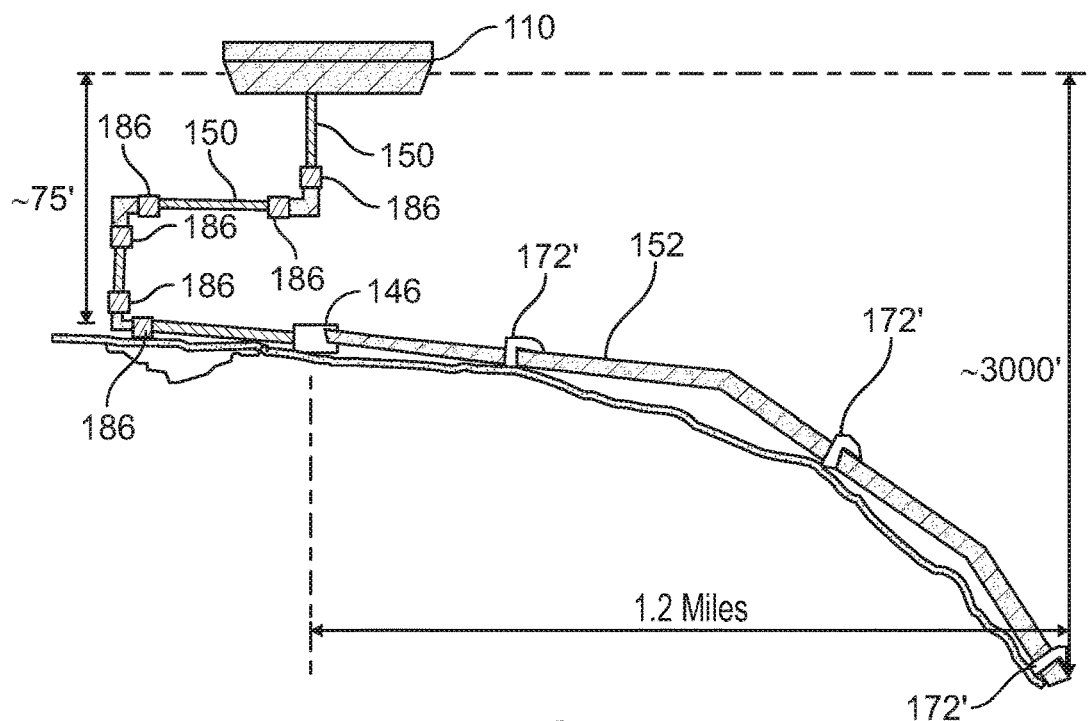
FIG. 25 illustrates a riser extending between a barge and a bottom-founded manifold.

The TST-constrained flexible joints 186 can provide significant versatility in designing riser configurations for attaching the barge 110 to the OTEC manifold 146. FIG. 25 shows another example riser configuration. At this site, the seafloor drops very steeply (almost vertically) beyond 450 feet depth. The distance between the barge and cold water at 3,800 feet deep is quite short compared to some other locations. The riser pipe assembly is articulated by 90-degree elbows connected to TST-constrained flexible joints 186. The number of risers depends on the number of pipes needed for the flow based on the size of the plant power output.

All references mentioned herein are incorporated by reference in their entirety.

A number of embodiments of the invention have been described. Nevertheless, it will be understood that various modifications may be made without departing from the spirit and scope of the invention. For example, OTEC plant can have three or more evaporator or condenser chambers, three or more warm water or cold water pumps, two or more intake and discharge seachest manifolds, or two or more cold water effluent SWAC seachest manifolds and three or more pipes to two or more pipe manifolds on shore; OTEC barge with mooring lines rising directly and attaching to mooring winches on the barge or rising to mooring cans before lines run to and attach to the barge; no overall deck covering so that the silhouette of the OTEC plant against the horizon is staggered by the images of the deck-mounted structure. Accordingly, other embodiments are within the scope of the following claims.

What is claimed is:

1. An offshore power generation system comprising:
    (a) a floating portable platform comprising;
        (1) one or more OTEC heat exchange units;
        (2) one or more turbine generators;
        (3) a water intake and discharge system;
        (4) a mooring system; and
    (b) a fixed manifold comprising:
        (1) one or more cold water intake connections in communication with a cold water pipe;
        (2) one or more cold water discharge connections in communication with the water intake system of the floating platform via an intermediate cold water conduit, wherein each cold water discharge connection is detachable from the intermediate cold water pipe;
        (3) one or more Warm Water discharge connections in communications with the water intake system of the floating platform via an intermediate warm water conduit, wherein each warm water discharge connection is detachable from the intermediate warm water pipe.

2. The system of claim 1 wherein each OTEC heat exchange unit is connected to the water intake and discharge system to allow for substantially linear flow of cold water and hot water across the OTEC heat exchange unit.

3. The system of claim 2 wherein each OTEC heat exchange unit comprises a plurality of heat exchange plates positioned in the flow path of the cold water supply.

4. The system of claim 2 wherein each OTEC heat exchange unit comprises a plurality of heat exchange plates positioned in the flow path of the warm water supply.

5. The system of claim 2 wherein an OTEC working fluid flows through an interior passage of one or more heat exchange plates, each heat exchange plate surrounded by and in the flow path of the cold or warm water supply.

6. The system of claim 1 wherein each OTEC heat exchange unit comprises four cascading heat exchange zones.

7. The system of claim 6 wherein each cascading heat exchange zone arranged to facilitate horizontal flow of the cold or warm water supply.

8. The system of claim 1 wherein the water intake and discharge system comprises a warm water supply pump and a cold water supply pump.

9. The system of claim 1 wherein the water intake and discharge system includes a warm or cold water discharge pump.

10. The system of claim 1 wherein one or more discharge pipes are in communication with the discharge of the water intake and discharge system.

11. The system of claim 10 wherein the discharge pipe is detachable from the water intake and discharge system.

12. The system of claim 10 wherein the terminal end of the cold water discharge pipe is at a depth between 25 and 500 feet.

13. The system of claim 10 wherein the terminal end of the warm water and cold water discharge pipes discharge water at a depth having a temperature within 10 degrees Fahrenheit of the ambient water.

14. The system of claim 10 further comprising:
    (a) a cold water discharge pipe in communication with the water intake and discharge system and the fixed manifold;
    (b) a warm water discharge pipe in communication with the water intake and discharge system and the fixed manifold;

wherein the warm and cold water discharge are mixed in the fixed manifold and discharged from the manifold at a temperature within 10 degrees Fahrenheit of the ambient water.

15. The system of claim 14 further comprising a mixing nozzle in communication with the warm and cold water discharge.

16. The system of claim 1 wherein the intermediate cold water pipe is detachable from the water and intake discharge system.

17. The system of claim 10 wherein the terminal end of the warm water discharge pipe is at a depth between 25 and 500 feet.

18. The system of claim 1 wherein the cold water pipe is coupled directly to the water intake and discharge system via a cold water pipe connection.

19. The system of claim 1 further comprising an auxiliary cold water supply exiting the fixed manifold and supplying an auxiliary system.

20. The system of claim 19 wherein the auxiliary system is a shore based air conditioning system.

* * * * *